US012630785B2

(12) United States Patent
Barros et al.

(10) Patent No.: US 12,630,785 B2
(45) **Date of Patent: *May 19, 2026**

(54) LIQUID FABRIC CARE COMPOSITIONS COMPRISING CAPSULES

(71) Applicant: The Procter & Gamble Company, Cincinnati, OH (US)

(72) Inventors: Andre Martim Barros, Woluwe Saint Etienne (BE); Mariana B. T. Cardoso, Brussels (BE); Johan Smets, Lubbeek (BE); Steven Daryl Smith, Fairfield, OH (US); Pierre Daniel Verstraete, Woluwe St Lambert (BE); Valerie Wong, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,649

(22) Filed: Jan. 22, 2024

(65) Prior Publication Data

US 2024/0158720 A1 May 16, 2024

Related U.S. Application Data

(63) Continuation of application No. 17/500,970, filed on Oct. 14, 2021, now Pat. No. 11,912,961.

(Continued)

(51) Int. Cl.

| | |
|---|---|
| ***C11D 3/00*** | (2006.01) |
| ***C11D 1/83*** | (2006.01) |

(Continued)

(52) U.S. Cl.

CPC .............. *C11D 3/0015* (2013.01); *C11D 1/83* (2013.01); *C11D 3/124* (2013.01); *C11D 3/30* (2013.01);

(Continued)

(58) Field of Classification Search

CPC ......... C11D 3/0015; C11D 1/83; C11D 3/124; C11D 3/30

See application file for complete search history.

(56) References Cited

U.S. PATENT DOCUMENTS

| | | | |
|---|---|---|---|
| 5,500,223 A | 3/1996 | Behan et al. | |
| 6,243,909 B1 | 6/2001 | Graham et al. | |

(Continued)

FOREIGN PATENT DOCUMENTS

| | | | |
|---|---|---|---|
| CA | 2980792 A1 * | 2/2010 | ............. A01N 25/28 |
| CN | 103432970 A | 12/2013 | |

(Continued)

OTHER PUBLICATIONS

All Office Actions; U.S. Appl. No. 18/581,755, filed on Feb. 20, 2024.

(Continued)

*Primary Examiner* — Mark Eashoo
*Assistant Examiner* — M. Reza Asdjodi
(74) *Attorney, Agent, or Firm* — Carolyn S. Powell; Andrew J. Mueller

(57) ABSTRACT

Liquid fabric care compositions that include certain fabric treatment adjuncts and/or water, where the compositions further include capsules characterized by substantially inorganic shells, for example silica-based shells. The present disclosure further relates to methods of making and using such compositions.

4 Claims, 4 Drawing Sheets

Related U.S. Application Data

(60) Provisional application No. 63/092,522, filed on Oct. 16, 2020.

(51) Int. Cl.

| | |
|---|---|
| ***C11D 3/12*** | (2006.01) |
| ***C11D 3/30*** | (2006.01) |
| ***C11D 3/34*** | (2006.01) |
| ***C11D 3/37*** | (2006.01) |
| ***C11D 3/50*** | (2006.01) |
| *C11D 1/14* | (2006.01) |
| *C11D 1/22* | (2006.01) |
| *C11D 1/72* | (2006.01) |
| *C11D 1/75* | (2006.01) |

(52) U.S. Cl.

CPC ............ *C11D 3/349* (2013.01); *C11D 3/3738* (2013.01); *C11D 3/505* (2013.01); *C11D 1/143* (2013.01); *C11D 1/22* (2013.01); *C11D 1/72* (2013.01); *C11D 1/75* (2013.01); *C11D 2111/12* (2024.01)

(56) References Cited

U.S. PATENT DOCUMENTS

| | | | | |
|---|---|---|---|---|
| 6,537,583 | B1 | 3/2003 | Dupuis et al. | |
| 8,425,940 | B2 | 4/2013 | Lapidot et al. | |
| 8,931,971 | B2 | 1/2015 | Schwarz et al. | |
| 9,192,548 | B2 | 11/2015 | Traynor | |
| 9,603,784 | B2 | 3/2017 | Shimizu et al. | |
| 10,046,291 | B2 | 8/2018 | Yamazaki | |
| 10,285,928 | B2 | 5/2019 | Marsh et al. | |
| 11,446,627 | B2 | 9/2022 | Cardoso et al. | |
| 11,628,413 | B2 | 4/2023 | Cardoso et al. | |
| 11,904,287 | B2 | 2/2024 | Cardoso et al. | |
| 11,912,961 | B2 | 2/2024 | Barros | |
| 11,938,349 | B2 | 3/2024 | Cetti | |
| 12,077,728 | B2 | 9/2024 | Barros | |
| 2004/0163674 | A1 | 8/2004 | Policicchio et al. | |
| 2005/0026800 | A1 | 2/2005 | Broeckx et al. | |
| 2005/0158369 | A1 | 7/2005 | Dorschner et al. | |
| 2006/0188551 | A1 | 8/2006 | Hauser et al. | |
| 2007/0082033 | A1 | 4/2007 | Doerschner et al. | |
| 2008/0096780 | A1 | 4/2008 | Veugelers et al. | |
| 2009/0143266 | A1* | 6/2009 | Meli ...................... | C11D 3/505 510/513 |
| 2009/0247449 | A1 | 10/2009 | Burdis | |
| 2010/0143422 | A1 | 6/2010 | Popplewell et al. | |
| 2010/0247660 | A1 | 9/2010 | Lei et al. | |
| 2011/0094416 | A1 | 4/2011 | Kawai | |
| 2011/0104221 | A1* | 5/2011 | Galeone ................. | A61Q 13/00 510/438 |
| 2011/0118161 | A1 | 5/2011 | Looft | |
| 2011/0152159 | A1 | 6/2011 | Labeque | |
| 2011/0177951 | A1 | 7/2011 | Toledano | |
| 2012/0104639 | A1 | 5/2012 | Traynor et al. | |
| 2012/0128747 | A1 | 5/2012 | Veronique et al. | |
| 2012/0202695 | A1 | 8/2012 | Toledano | |
| 2012/0237578 | A1 | 9/2012 | Lei | |
| 2012/0256336 | A1 | 10/2012 | Yano | |
| 2013/0040817 | A1 | 2/2013 | Dreher | |
| 2014/0044761 | A1 | 2/2014 | Lei et al. | |
| 2014/0331414 | A1 | 11/2014 | Bone | |
| 2014/0338134 | A1 | 11/2014 | Fernandez Prieto et al. | |
| 2014/0342972 | A1 | 11/2014 | Smets | |
| 2016/0168509 | A1* | 6/2016 | Hitchcock .......... | C11D 17/0039 512/4 |
| 2016/0168510 | A1 | 6/2016 | Tasker et al. | |
| 2016/0168511 | A1 | 6/2016 | Hitchcock et al. | |
| 2016/0184196 | A1 | 6/2016 | Baxter et al. | |
| 2016/0303531 | A1 | 10/2016 | Yamazaki | |
| 2016/0317993 | A1 | 11/2016 | Rotello et al. | |
| 2017/0073237 | A1 | 3/2017 | Lim | |
| 2017/0349865 | A1* | 12/2017 | Zerhusen ............... | C11D 3/373 |
| 2018/0085291 | A1 | 3/2018 | Sasaki | |
| 2018/0207451 | A1 | 7/2018 | Toledano | |
| 2018/0339176 | A1 | 11/2018 | Toledano | |
| 2020/0114328 | A1 | 4/2020 | Jerri et al. | |
| 2020/0129947 | A1 | 4/2020 | Ouali et al. | |
| 2020/0255776 | A1 | 8/2020 | Schmiedel et al. | |
| 2020/0330948 | A1 | 10/2020 | Cardoso et al. | |
| 2020/0330949 | A1 | 10/2020 | Cardoso et al. | |
| 2020/0330950 | A1 | 10/2020 | Cardoso et al. | |
| 2022/0118287 | A1 | 4/2022 | Cetti et al. | |
| 2022/0118417 | A1 | 4/2022 | Smith et al. | |
| 2022/0119740 | A1 | 4/2022 | Barros et al. | |
| 2022/0119741 | A1 | 4/2022 | Smets et al. | |
| 2022/0119742 | A1 | 4/2022 | Smets et al. | |
| 2022/0119743 | A1 | 4/2022 | Barros et al. | |
| 2022/0119745 | A1 | 4/2022 | Barros et al. | |
| 2022/0258118 | A1 | 8/2022 | Cardoso et al. | |
| 2023/0201786 | A1 | 6/2023 | Cardoso | |
| 2024/0060003 | A1 | 2/2024 | Lynch | |
| 2024/0060012 | A1 | 2/2024 | Lynch | |

FOREIGN PATENT DOCUMENTS

| | | | |
|---|---|---|---|
| CN | 105612248 | A | 5/2016 |
| CN | 105734540 | A | 7/2016 |
| CN | 106397675 | A | 2/2017 |
| CN | 107001979 | A | 8/2017 |
| CN | 109908966 | A | 6/2019 |
| CN | 107249545 | B | 5/2021 |
| EP | 1767613 | A1 | 3/2007 |
| EP | 1767614 | A1 | 3/2007 |
| EP | 2078696 | A1 | 7/2009 |
| EP | 3181674 | A1 | 6/2017 |
| EP | 2865423 | B1 | 3/2020 |
| JP | 2010209132 | A | 9/2010 |
| JP | 2010215806 | A | 9/2010 |
| JP | 2012207067 | A | 10/2012 |
| WO | 0145615 | A1 | 6/2001 |
| WO | 2005044220 | A1 | 5/2005 |
| WO | 2007019201 | A1 | 2/2007 |
| WO | 2009106318 | A2 | 9/2009 |
| WO | 2011154421 | A1 | 12/2011 |
| WO | 2013078551 | A1 | 6/2013 |
| WO | 2013083760 | A2 | 6/2013 |
| WO | 2013174921 | A1 | 11/2013 |
| WO | 2016100477 | A1 | 6/2016 |
| WO | 2016100479 | A1 | 6/2016 |
| WO | 2017016636 | A1 | 2/2017 |
| WO | 2017075074 | A1 | 5/2017 |
| WO | 2017161364 | A1 | 9/2017 |
| WO | 2018189588 | A1 | 10/2018 |
| WO | 2018231886 | A1 | 12/2018 |
| WO | 2019108713 | A1 | 6/2019 |
| WO | 2019108718 | A1 | 6/2019 |
| WO | 2020077451 | A1 | 4/2020 |
| WO | 2020214876 | A1 | 10/2020 |
| WO | 2020214877 | A1 | 10/2020 |
| WO | 2020214878 | A1 | 10/2020 |

OTHER PUBLICATIONS

Unpublished U.S. Appl. No. 18/581,755, filed Feb. 20, 2024, to Jonathan Robert Cetti et al.

Search Report and Written Opinion for PCT/US2021/071853 dated Apr. 26, 2022, 17 pages.

All Office Actions; U.S. Appl. No. 16/851,176, filed on Apr. 17, 2020.

All Office Actions; U.S. Appl. No. 16/851,194, filed on Apr. 17, 2020.

All Office Actions; U.S. Appl. No. 16/851,173, filed on Apr. 17, 2020.

All Office Actions; U.S. Appl. No. 17/498,016, filed on Oct. 11, 2021.

All Office Actions; U.S. Appl. No. 17/500,970, filed on Oct. 14, 2021.

All Office Actions; U.S. Appl. No. 17/500,979, filed on Oct. 14, 2021.

(56) References Cited

OTHER PUBLICATIONS

All Office Actions; U.S. Appl. No. 17/500,984, filed on Oct. 14, 2021.
All Office Actions; U.S. Appl. No. 17/501,186, filed on Oct. 14, 2021.
All Office Actions; U.S. Appl. No. 17/501,202, filed on Oct. 14, 2021.
All Office Actions; U.S. Appl. No. 17/727,857, filed on Apr. 25, 2022.
All Office Actions; U.S. Appl. No. 18/115,890, filed on Mar. 1, 2023.
All Office Actions; U.S. Appl. No. 18/410,116, filed on Jan. 11, 2024.
Jyothi et al., "Microencapsulation techniques, factors influencing encapsulation efficiency", Journal of Microencapsulation, 27:3, pp. 187-197.
Liu M., "Understanding the mechanical strength of micro capsules and their adhesion on fabric surfaces", 2010, University of Birmingham, XP055511234, pp. 86-89.
Thompson et al., "Colloidosomes: Synthesis, properties and applications", Journal of Colloid and Interface Science, 447, 2015, pp. 217-228.
Unpublished U.S. Appl. No. 18/410,116, filed Jan. 11, 2024, to Mariana B. T. Cardoso et al.
All Office Actions: U.S. Appl. No. 18/894,382, filed on Sep. 24, 2024.
Unpublished U.S. Appl. No. 18/894,382, filed Sep. 24, 2024, Andre Martim Barros et al.
Merriam-Websters Dictionary ,Online Retrieved from Internet: https://www.merriam-webster.com/dictionary/apply, No Known Date, 1 page.

* cited by examiner

LIQUID FABRIC CARE COMPOSITIONS COMPRISING CAPSULES

FIELD OF THE INVENTION

The present disclosure relates to liquid fabric care compositions that include certain fabric treatment adjuncts and/or water, and further including capsules characterized by substantially inorganic shells, for example silica-based shells. The present disclosure further relates to methods of making and using such compositions.

BACKGROUND OF THE INVENTION

Many liquid fabric care products are formulated with perfumed core/shell capsules. Typically, the cores of such capsules include perfume, and the shell often comprises a polymeric material such as an aminoplast, a polyurea, or a polyacrylate. These capsules are useful in delivering the benefit agent to a target surface, such as a fabric. Then, at various touchpoints, the capsules will rupture, releasing the perfume. However, perfume capsules are known to leak in the liquid environment of the consumer product, thereby reducing the efficiency of the perfume delivery system.

Furthermore, the perfume capsules typically encapsulate a variety of perfume raw materials ("PRMs"). Problematically, different PRMs may leak at different rates through the capsule wall. Over time, such as while the product is being transported or stored, the character of the perfume can change due to some PRMs leaking more than others. This can lead to olfactory experiences that are less desirable than what the manufacturer formulated for, quality control issues, and even consumer dissatisfaction when the freshness profile provided by the first dose of the product is different than that provided by the last dose.

There is a need for liquid fabric care products that include perfume delivery systems that have improved perfume leakage profiles.

SUMMARY OF THE INVENTION

The present disclosure relates to liquid fabric care compositions that include populations of capsules that have substantially inorganic shells.

For example, the present disclosure relates to a liquid fabric care composition that includes a fabric treatment adjunct, where the fabric treatment adjunct is selected from a conditioning active, a surfactant, or a mixture thereof, where the conditioning active, if present, is selected from an alkyl quaternary ammonium compound ("alkyl quat"), an alkyl ester quaternary ammonium compound ("alkyl ester quat"), or mixtures thereof, and where the surfactant, if present, is selected from anionic surfactant, nonionic surfactant, cationic surfactant, zwitterionic surfactant, amphoteric surfactant, ampholytic surfactant, or mixtures thereof; and a population of capsules, the capsules including a core and a shell surrounding the core, where the core includes perfume raw materials, where the shell includes (a) a substantially inorganic first shell component that includes a condensed layer and a nanoparticle layer, where the condensed layer includes a condensation product of a precursor, where the nanoparticle layer includes inorganic nanoparticles, and where the condensed layer is disposed between the core and the nanoparticle layer, and (b) an inorganic second shell component surrounding the first shell component, where the second shell component surrounds the nanoparticle layer.

The present disclosure further relates to a liquid fabric care composition that includes from about 5% to about 99.5%, by weight of the composition, of water, and a population of capsules, the capsules including a core and a shell surrounding the core, where the core includes perfume raw materials, where the shell includes (a) a substantially inorganic first shell component that includes a condensed layer and a nanoparticle layer, where the condensed layer includes a condensation product of a precursor, where the nanoparticle layer includes inorganic nanoparticles, and where the condensed layer is disposed between the core and the nanoparticle layer, and (b) an inorganic second shell component surrounding the first shell component, where the second shell component surrounds the nanoparticle layer.

The present disclosure further relates to a process for treating a surface, preferably a fabric, where the process includes the step of contacting the surface with a liquid fabric care composition as described herein, optionally in the presence of water.

The present disclosure further relates to a process for treating a surface, where the process includes providing a liquid base composition comprising a fabric treatment adjunct and/or water, where the fabric treatment adjunct is selected from a conditioning active, a surfactant, or a mixture thereof, and providing a population of capsules to the base composition.

BRIEF DESCRIPTION OF THE DRAWINGS

The figures herein are illustrative in nature and are not intended to be limiting.

DETAILED DESCRIPTION OF THE INVENTION

Figure 1:
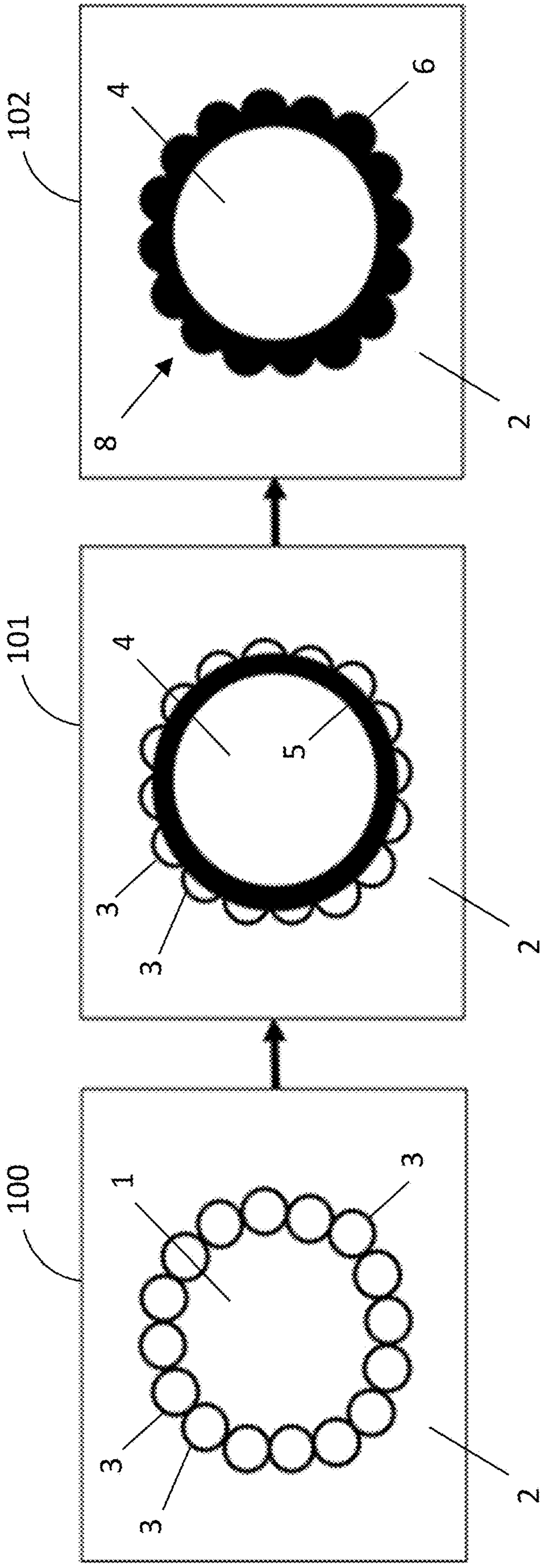
FIG. 1 shows a schematic illustration of the method of making capsules with a first shell component, prepared with a hydrophobic core.

The present disclosure relates to liquid fabric care compositions that include certain fabric treatment actives (e.g., a conditioning active and/or a surfactant) and populations of certain capsules. The capsules contain perfume raw materials. Furthermore, the shells of the capsules contain inorganic materials, the selection of which results in improved mechanical properties and low and/or consistent permeability.

For example, it has been found that the capsules of the present disclosure work surprisingly well in controlling the leakage of the perfume raw materials in the presently disclosed compositions, resulting in relatively low and consistent perfume leakage. Without wishing to be bound by theory, it is believed that the leakage of perfume raw materials is driven by radically different mechanisms for shell containing highly crosslinked inorganic materials compared to shell containing organic polymeric materials. Specifically, the diffusion of small molecules such as perfume raw materials ("PRMs") across a homogenous organic polymeric shell is similar to the diffusion mechanism across a homogeneous polymeric membrane. In this case, the permeability of the polymeric membrane for a given solute depends both on the polymer free volume (impacted by degree of crystallinity and cross-linked density) as well as the relative solubility of the solute for the polymer. Since different PRMs will have different ranges of relevant physical and chemical properties (e.g., molecular weight and polarity), the rates of diffusion are not uniform for a given set of PRMs when the physical and chemical properties are also not uniform.

On the other hand, it is believed that diffusion of small molecules across a highly crosslinked inorganic shell occurs primarily through the microchannels formed by the percolating network of micropores present in the shell. Such highly crosslinked inorganic shell can be obtained by using a second shell component in combination with a first shell component, as disclosed with the present disclosure. In this case, it is believed that the permeability of the inorganic shell primarily depends on the number, density, and dimensions of the microchannels that are effectively connecting the core and continuous phases, which can result in the PRM leakage rates being relatively uniform or consistent with respect to each other, as well as being relatively low.

Because the various PRMs leak from the disclosed capsules in the disclosed compositions at relatively consistent rates, it is further believed that the intended character of the perfume is maintained, leading to a more satisfactory and consistent olfactory performance.

The components, compositions, and related processes are described in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Liquid Fabric Care Composition

The present disclosure relates to liquid fabric care compositions. The liquid fabric care composition may be a liquid fabric enhancer, a liquid detergent (e.g., a heavy-duty liquid detergent), a sprayable fabric refresher composition, or a combination thereof.

The compositions may comprise a fabric treatment adjunct and a population of capsules. The capsules contain perfume and may provide aromatic/freshness benefits at various touchpoints. The fabric treatment adjunct may provide a benefit to a target fabric, such as a conditioning or cleaning benefit. For example, suitable fabric treatment adjuncts may include conditioning actives, such as ester quaternary ammonium compounds, and/or surfactants, such as anionic or nonionic surfactants.

The composition may include water. The composition may be substantially aqueous. The composition may comprise at least 5% of water, preferably at least 25%, preferably at least 50% by weight of water, preferably at least 75%, or even more than 85% by weight of water. The composition may comprise from about 5% to about 99.5%, or from about 50% to about 99.5%, preferably from about 50% to about 99.5%, more preferably from about 60% to about 95%, even more preferably from about 75% to about 90%, by weight of the composition, of water.

The liquid fabric care composition may be packaged in a pourable bottle, and in such cases, it may be preferred that the composition comprises from about 50% to about 99%, or from about 60% to about 95%, or from about 70% to about 90%, by weight of the composition, of water. As described in more detail below, the liquid fabric care composition may be packaged in a sprayable bottle, and in such cases, it may be preferred that the composition comprises from about 75% to about 99.5%, preferably from about 80 to about 99%, or from about 90 to about 99%, or from about 95% to about 99%, by weight of the composition, of water.

The liquid fabric care composition may be in the form of a sprayable product. For example, the liquid fabric composition may be contained in a spray dispenser, which may include (a) a bottle for containing the liquid composition and (b) a spray engine.

The bottle may be configured as a container having a base and sidewall wall that terminates at an opening. The bottle may include a bag-in-bag or bag-in-can container.

The spray engine may be configured in various ways, such as a direct compression-type trigger sprayer, a pre-compression-type trigger sprayer, or an aerosol-type spray dispenser. One suitable spray dispenser is the TS800 Trigger Sprayer (Exxon Mobil PP1063, material classification 10003913, Manufacturer: Calmar). Another suitable spray engine includes a continuous action sprayer, such as FLAIROSOL™ dispenser from Afa Dispensing Group. The FLAIROSOL™ dispenser includes a pre-compression spray engine and aerosol-like pressurization of the aqueous composition through the use of a pressure or buffer chamber. Suitable trigger sprayers or finger pump sprayers are readily available from suppliers such as Calmar, Inc., City of Industry, Calif.; CSI (Continental Sprayers, Inc.), St. Peters, Mo.; Berry Plastics Corp., Evansville, Ind. (a distributor of Guala® sprayers); or Seaquest Dispensing, Cary, Ill (a distributor of the cylindrical Euromist II®). If the spray dispenser is configured as an aerosol, the spray dispenser may be pressurized with a propellant. Any suitable propellant may be used.

The composition may be in the form of a unitized dose article, such as a pouch. Such pouches typically include a water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The composition may have a viscosity of from 1 to 1500 centipoises (1-1500 mPa*s), from 100 to 1000 centipoises (100-1000 mPa*s), or from 200 to 500 centipoises (200-500 mPa*s) at 20 $s^{-1}$ and 21° C.

The compositions of the present disclosure may be characterized by a pH of from about 2 to about 12, or from about 2 to about 8.5, or from about 2 to about 7, or from about 2 to about 5. The compositions of the present disclosure may have a pH of from about 2 to about 4, preferably a pH of from about 2 to about 3.7, more preferably a pH from about 2 to about 3.5, preferably in the form of an aqueous liquid. It is believed that such pH levels facilitate stability of the quaternary ammonium compound, particularly quaternary ammonium ester compounds. The pH of a composition is determined by dissolving/dispersing the composition in deionized water to form a solution at 10% concentration, at about 20° C.

Fabric Treatment Adjunct

The liquid fabric care compositions of the present disclosure may comprise a fabric treatment adjunct. The fabric treatment adjunct may be selected to provide a benefit to a target fabric, such as a conditioning or cleaning benefit. For example, suitable fabric treatment adjuncts may include conditioning actives, such as ester quaternary ammonium compounds, and/or surfactants, such as anionic or nonionic surfactant. Additionally or alternatively, the fabric treatment adjunct may be selected to provide processing and/or stability benefits to the fabric care composition. These materials are described in more detail below.

a. Conditioning Active

The liquid fabric care compositions of the present disclosure may comprise a conditioning active. These materials can provide conditioning or softening benefits to a target surface and are particularly useful when the composition is in the form of a fabric enhancer composition.

The conditioning active, when present, is selected from the group consisting of an alkyl quaternary ammonium compound ("alkyl quat"), an alkyl ester quaternary ammonium compound ("alkyl ester quat"), and mixtures thereof. For environmental/biodegradability reasons, it may be preferred that the conditioning active comprises an alkyl ester quat.

The conditioning active may be present at a level of from about 0.1% to about 50%, or from about 2% to about 40%, or from about 3% to about 25%, preferably from 4% to 18%, more preferably from 5% to 15%, by weight of the composition. The conditioning active may be present at a level of from greater than 0% to about 50%, or from about 1% to about 35%, or from about 1% to about 25%, or from about 3% to about 20%, or from about 4.0% to 18%, more preferably from 4.5% to 15%, even more preferably from 5.0% to 12% by weight of the composition. The conditioning active may be present at a level of from about 1% to about 8%, or from about 1.5% to about 5%, by weight of the composition. The level of conditioning active may depend of the desired concentration of total conditioning active in the composition (diluted or concentrated composition) and of the presence (or not) of other conditioning/softening materials. At very high conditioning active levels, the viscosity may no longer be sufficiently controlled which renders the product unfit for use. However, if the conditioning active levels are too low, the benefit delivered may be suboptimal.

The conditioning active may be derived from fatty acids (sometimes called parent fatty acids). The fatty acids may include saturated fatty acids and/or unsaturated fatty acids. The fatty acids may be characterized by an iodine value (see Methods). Preferably, the iodine value of the fatty acid from which the quaternary ammonium fabric compound is formed is from 0 to 140, or from 0 to about 90, or from about 10 to about 70, or from about 15 to about 50, or from about 18 to about 30. The iodine value may be from about 25 to 50, preferably from 30 to 48, more preferably from 32 to 45. Without being bound by theory, lower melting points resulting in easier processability of the FCA are obtained when the fatty acid from which the quaternary ammonium compound is formed is at least partially unsaturated. In particular, it is believed that double unsaturated fatty acids enable easy-to-process FCAs.

The fatty acids may include an alkyl portion containing, on average by weight, from about 13 to about 22 carbon atoms, or from about 14 to about 20 carbon atoms, preferably from about 16 to about 18 carbon atoms.

Suitable fatty acids may include those derived from (1) an animal fat, and/or a partially hydrogenated animal fat, such as beef tallow, lard. etc.; (2) a vegetable oil, and/or a partially hydrogenated vegetable oil such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, etc.; (3) processed and/or bodied oils, such as linseed oil or tung oil via thermal, pressure, alkali-isomerization and catalytic treatments; (4) a mixture thereof, to yield saturated (e.g. stearic acid), unsaturated (e.g. oleic acid).

polyunsaturated (linoleic acid), branched (e.g. isostearic acid) or cyclic (e.g. saturated or unsaturated α-disubstituted cyclopentyl or cyclohexyl derivatives of polyunsaturated acids) fatty acids.

The conditioning active may comprise compounds formed from fatty acids that are unsaturated. The fatty acids may comprise unsaturated C18 chains, which may be include a single double bond ("C18:1") or may be double unsaturated ("C18:2").

The conditioning active may be derived from fatty acids and optionally from triethanolamine, preferably unsaturated fatty acids that include eighteen carbons ("C18 fatty acids"), more preferably C18 fatty acids that include a single double bone ("C18:1 fatty acids"). The conditioning active may comprise from about 10% to about 40%, or from about 10% to about 30%, or from about 15% to about 30%, by weight of the conditioning active, of compounds derived from triethanolamine and C18:1 fatty acids. Such levels of fatty acids may facilitate handling of the resulting ester quat material.

The fatty acid from which the conditioning active is formed may comprise from 1.0% to 20.0%, preferably from 1.5% to 18.0%, or from 3.0% to 15.0%, more preferably from 4.0% to 15.0% of double unsaturated C18 chains ("C18:2") by weight of total fatty acid chains. From about 2% to about 10%, or from about 2% to about 8%, or from about 2% to about 6%, by weight of the total fatty acids used to form the conditioning active, may be C18:2 fatty acids.

On the other hand, very high levels of unsaturated fatty acid chains are to be avoided to minimize malodour formation as a result of oxidation of the fabric softener composition over time.

Suitable conditioning active alkyl ester quats selected from the group consisting of monoester quaternary material ("monoester quats"), diester quaternary material ("diester quats"), triester quaternary material ("trimester quats"), and mixtures thereof. The level of monoester quat may be from 2.0% to 40.0%, the level of diester quat may be from 40.0% to 98.0%, and the level of triester quat may be from 0.0% to 30.0%, by weight of total conditioning active. The level of monoester quat may be from 2.0% to 40.0%, the level of diester quat may be from 40.0% to 98.0%, and the level of triester quat may be less than 5.0%, or less than 1.0%, or even 0.0%, by weight of total conditioning active. The level of monoester quat may be from 15.0% to 35.0%, the level of diester quat may be from 40.0% to 60.0%, and the level of triester quat may be from 15% to 38.0%, by weight of total conditioning active. The quaternary ammonium ester compound may comprise triester quaternary ammonium material ("triester quats").

Suitable alkyl ester quats may be derived from alkanolamines, for example, C1-C4 alkanolamines, preferably C2 alkanolamines (e.g., ethanolamines). The alkyl ester quats may be derived from monoalkanolamines, dialkanolamines, trialkanolamines, or mixtures thereof, preferably monoethanolamines, diethanolamines, di-isopropanolamines, triethanolamines, or mixtures thereof. The alkyl ester quats may be derived from diethanolamines The alkyl ester quats may be derived from di-isopropanolamines. The alkyl ester quats may be derived from triethanolamines The alkanolamines from which the alkyl ester quats are derived may be alkylated mono- or dialkanolamines, for example C1-C4 alkylated alkanolamines, preferably C1 alkylated alkanolamines (e.g, N-methyldiethanolamine).

The conditioning active may comprise a quaternized nitrogen atom that is substituted, at least in part. The quaternized nitrogen atom may be substituted, at least in part, with one or more C1-C3 alkyl or C1-C3 hydroxyl alkyl groups. The quaternized nitrogen atom may be substituted, at least in part, with a moiety selected from the group consisting of methyl, ethyl, propyl, hydroxyethyl, 2-hydroxypropyl, 1-methyl-2-hydroxyethyl, poly($C_2$-$C_3$ alkoxy), polyethoxy, benzyl, more preferably methyl or hydroxyethyl.

The conditioning active may comprise compounds according to Formula (1):

$$\{R^2_{(4-m)}\text{-N+-}[X\text{-}Y\text{-}R^1]_m\}A^- \qquad \text{Formula (1)}$$

wherein:

m is 1, 2 or 3, with provisos that, in a given molecule, the value of each m is identical;

each $R^1$, which may comprise from 13 to 22 carbon atoms, is independently a linear hydrocarbyl or branched hydrocarbyl group, preferably $R^1$ is linear, more preferably $R^1$ is partially unsaturated linear alkyl chain;

each $R^2$ is independently a $C_1$-$C_3$ alkyl or hydroxyalkyl group and/or each $R^2$ is selected from methyl, ethyl, propyl, hydroxyethyl, 2-hydroxypropyl, 1-methyl-2-hydroxyethyl, poly($C_2$-$C_3$ alkoxy), polyethoxy, benzyl, more preferably methyl or hydroxyethyl;

each X is independently $-(CH_2)_n-$, $-CH_2-CH(CH_3)-$ or $-CH(CH_3)-CH_2-$, where each n is independently 1, 2, 3 or 4, preferably each n is 2;

each Y is independently —O—(O)C— or —C(O)—O—; and

A- is independently selected from the group consisting of chloride, bromide, methyl sulfate, ethyl sulfate, sulfate, and nitrate, preferably A- is selected from the group consisting of chloride and methyl sulfate, more preferably A- is methyl sulfate.

At least one X, preferably each X, may be independently selected from $-CH_2-CH(CH_3)-$ or $-CH(CH_3)-CH_2-$. When m is 2, X may be selected from $*-CH_2-CH(CH_3)-$, $*-CH(CH_3)-CH_2-$, or a mixture thereof, where the * indicates the end nearest the nitrogen of the alkyl ester quat. When there are two or more X groups present in a single compound, at least two of the X groups may be different from each other. For example, when m is 2, one X (e.g., a first X) may be $*-CH_2-CH(CH_3)-$, and the other X (e.g., a second X) may be $*-CH(CH_3)-CH_2-$, where the * indicates the end nearest the nitrogen of the alkyl ester quat. It has been found that such selections of the m index and X groups can improve the hydrolytic stability of the alkyl ester quat, and hence further improve the stability of the composition.

For similar stability reasons, the conditioning active may comprise a mixture of: bis-(2-hydroxypropyl)-dimethylammonium methylsulfate fatty acid ester; (2-hydroxypropyl)-(1-methyl-2-hydroxyethyl)-dimethylammonium methylsulfate fatty acid ester; and bis-(1-methyl-2-hydroxyethyl)-dimethylammonium methylsulfate fatty acid ester; where the fatty acid esters are produced from a C12-C18 fatty acid mixture. The conditioning active may comprise any of the fatty acid esters, individually or as a mixture, listed in this paragraph.

Each X may be $-(CH_2)_n-$, where each n is independently 1, 2, 3 or 4, preferably each n is 2.

Each $R^1$ group may correspond to, and/or be derived from, the alkyl portion(s) of any of the parent fatty acids provided above. The $R^1$ groups may comprise, by weight average, from about 13 to about 22 carbon atoms, or from about 14 to about 20 carbon atoms, preferably from about 16 to about 18 carbon atoms. It may be that when Y is *—O—(O)C— (where the * indicates the end nearest the X moiety), the sum of carbons in each R 1 is from 13 to 21, preferably from 13 to 19.

The conditioning active of the present disclosure may include a mixture of quaternary ammonium compounds according to Formula (1), for example, having some compounds where m=1 (e.g., monoesters) and some compounds where m=2 (e.g., diesters). Some mixtures may even contain compounds where m=3 (e.g., triesters). The quaternary ammonium compounds may include compounds according to Formula (1), where m is 1 or 2, but not 3 (e.g., is substantially free of triesters).

The conditioning active of the present disclosure may include compounds according to Formula (1), wherein each $R^2$ is a methyl group. The conditioning active of the present disclosure may include compounds according to Formula (1), wherein at least one $R^2$, preferably wherein at least one $R^2$ is a hydroxyethyl group and at least one $R^2$ is a methyl group. For compounds according to Formula (1), m may equal 1, and only one $R^2$ may be a hydroxyethyl group.

The conditioning active of the present disclosure may include methyl sulfate as a counterion. When the conditioning active of the present disclosure comprise compounds according to Formula (1), A- may preferably be methyl sulfate. Without wishing to be bound by theory, it is believed that esterquats with a methyl sulphate as a counterion have lower electrostatic repulsive forces compared to those with chloride, as the methylsulphate counterion is bound more tightly compared to chloride, which may result in more effective deposition on a target surface, such as a fabric.

The conditioning active of the present disclosure may comprise one or members selected from the group consisting of:

(A) bis-(2-hydroxypropyl)-dimethylammonium methylsulfate fatty acid ester and isomers of bis-(2-hydroxypropyl)-dimethylammonium methylsulfate fatty acid ester and/or mixtures thereof; N,N-bis-(2-(acyl-oxy)-propyl)-N,N-dimethylammonium methylsulfate and/or N-(2-(acyl-oxy)-propyl) N-(2-(acyl-oxy) 1-methyl-ethyl) N,N-dimethylammonium methylsulfate and/or mixtures thereof, in which the acyl moiety is derived from c12-c22 fatty acids such as Palm, Tallow, Canola and/or other suitable fatty acids, which can be fractionated and/or hydrogenated, and/or mixtures thereof;

(B) 1,2-di(acyloxy)-3-trimethylammoniopropane chloride in which the acyl moiety is derived from c12-c22 fatty acids such as Palm, Tallow, Canola and/or other suitable fatty acids, which can be fractionated and/or hydrogenated, and/or mixtures thereof;

(C) N,N-bis(hydroxyethyl)-N,N-dimethyl ammonium chloride fatty acid esters; N,N-bis(acyl-oxy-ethyl)-N, N-dimethyl ammonium chloride in which the acyl moiety is derived from c12-c22 fatty acids such as Palm, Tallow, Canola and/or other suitable fatty acids, which can be fractionated and/or hydrogenated, and/or mixtures thereof, such as N,N-bis (tallowoyl-oxy-ethyl) N,N-dimethyl ammonium chloride;

(D) esterification products of Fatty Acids with Triethanolamine, quaternized with Dimethyl Sulphate; N,N-bis(acyl-oxy-ethyl) N-(2-hydroxyethyl)-N-methyl ammonium methylsulfate in which the acyl moiety is derived from c12-c22 fatty acids such as Palm, Tallow, Canola and/or other suitable fatty acids, which can be fractionated and/or hydrogenated, and/or mixtures thereof, such as N,N-bis(tallowoyl-oxy-ethyl) N-(2-hydroxyethyl)-N-methyl ammonium methylsulfate;

(E) dicanoladimethylammonium chloride; di(hard)tallowdimethylammonium chloride; dicanoladimethylammonium methylsulfate; 1-methyl-1-stearoylamidoethyl-2-stearoylimidazolinium methylsulfate; 1-tallowylamidoethyl-2-tallowylimidazoline; dipalmylmethyl hydroxyethylammoinum methylsulfate; and/or (F) mixtures thereof.

Examples of suitable conditioning active are commercially available from Evonik under the tradename Rewoquat WE18 and/or Rewoquat WE20, and from Stepan under the tradename Stepantex GA90, Stepantex VK90, and/or Stepantex VL90A.

It is understood that compositions that comprise a conditioning active as a fabric conditioning active may further comprise non-quaternized derivatives of such compounds, as well as unreacted reactants (e.g., free fatty acids).

The liquid fabric care compositions of the present disclosure may comprise other conditioning materials, for example in addition to alkyl quats and/or alkyl ester quats. Such materials may include silicones, amines, fatty esters, sucrose esters, silicones, dispersible polyolefins, polysaccharides, fatty acids, softening or conditioning oils, polymer latexes, or combinations thereof, preferably silicone. The combined total amount of conditioning active (as described above) and silicone may be from about 5% to about 70%, or from about 6% to about 50%, or from about 7% to about 40%, or from about 10% to about 30%, or from about 15% to about 25%, by weight of the composition. The composition may include a conditioning active (as described above) and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

b. Surfactants

The liquid fabric care compositions of the present disclosure may comprise a surfactant as the fabric treatment adjunct. These materials can provide cleaning benefits to a target surface and are particularly useful when the composition is in the form of a liquid detergent composition, such as a heavy-duty liquid ("HDL") detergent composition. Additionally or alternatively, surfactants may serve as processing and/or stability aids.

The surfactant may comprise one or more surfactants, preferably two or more. When more than one surfactant is present, it may be considered a surfactant system.

The surfactant, when present, may be selected from the group consisting of anionic surfactants, nonionic surfactants, cationic surfactants, zwitterionic surfactants, amphoteric surfactants, ampholytic surfactants, and mixtures thereof. Preferably, the surfactant comprises anionic surfactant, nonionic surfactant, zwitterionic surfactant, or a mixture thereof. More preferably, the surfactant may comprise at least one anionic surfactant, even more preferably at least two anionic surfactants, as such systems can provide efficient cleaning benefits. The surfactant may comprise a combination of anionic surfactant and nonionic surfactant, optionally in further combination with zwitterionic surfactant.

The composition may comprise from about 1%, or from about 5%, or from about 10%, or from about 15%, or from about 20%, or from about 30%, to about 80%, or to about 65%, or to about 50%, or to about 45%, or to about 35%, or to about 25%, by weight of the composition, of a surfactant. The composition may comprise from about 1% to about 50%, preferably from about 5% to about 45%, more preferably from about 10% to about 40%, by weight of the composition, of surfactant.

A typical HDL detergent may comprise from about 5% to about 50%, preferably from about 7% to about 40%, more preferably from about 10% to about 35%, by weight of the composition, of surfactant, preferably anionic surfactant. A compacted liquid detergent, such as one that may be encapsulated in a water-soluble film, may comprise from about 15% to about 50%, or from about 15% to about 45%, or from about 20% to about 40%, by weight of the composition, of surfactant, preferably anionic surfactant.

The composition may comprise anionic surfactant. Anionic surfactants may be particularly useful for providing cleaning or soil removal benefits. Suitable anionic surfactants include alkoxylated alkyl sulfates, non-alkoxylated alkyl sulfates, alkyl benzene sulphonates, and mixtures thereof. The anionic surfactants may be linear, branched (e.g., mid-chain branched), or a combination thereof. Other suitable anionic surfactants may include methyl ester sulfonates, paraffin sulfonates, a-olefin sulfonates, internal olefin sulfonates, and mixtures thereof. Still other suitable anionic surfactants may include alkyl ether carboxylates, comprising a C10-C26 linear or branched, preferably C10-C20 linear, most preferably C16-C18 linear alkyl alcohol and from 2 to 20, preferably 7 to 13, more preferably 8 to 12, most preferably 9.5 to 10.5 ethoxylates. The acid form or salt form, such as sodium or ammonium salt, may be used, and the alkyl chain may contain one cis or trans double bond. Alkyl ether carboxylic acids are available from Kao (Akypo®), Huntsman (Empicol®) and Clariant (Emulsogen®). Other specific anionic surfactants may include C11.8 linear alkyl benzene sulfonate, alkyl ethoxylated sulfate having an average of 1.8 ethoxy groups, and alkyl ethoxylated sulfate having an average of 3 ethoxy groups.

The anionic surfactants may exist in an acid form, and the acid form may be neutralized, partially or completely, to form a surfactant salt. Typical agents for neutralization include: metal counterion bases, such as hydroxides, e.g., NaOH or KOH; ammonia; amines; and/or alkanolamines, such as monoethanolamine, diethanolamine, and/or triethanolamine.

The composition may comprise nonionic surfactant. Nonionic surfactants can be useful for providing soil removal benefits; they can also be useful in providing processing and/or stability benefits, for example helping to solubilize perfume. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branhed alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

The compositions disclosed herein may comprise a cationic surfactant. Non-limiting examples of cationic surfactants include: the quaternary ammonium surfactants, which can have up to 26 carbon atoms and may include alkoxylate quaternary ammonium (AQA) surfactants, dimethyl hydroxyethyl quaternary ammonium, and/or dimethyl hydroxyethyl lauryl ammonium chloride; polyamine cationic surfactants; cationic ester surfactants; amino surfactants, e.g., amido propyldimethyl amine (APA); and mixtures thereof. For detersive effects, cationic surfactants are preferably used in combination with anionic surfactants.

The compositions disclosed herein may comprise a zwitterionic surfactant. Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. Suitable examples of zwitterionic surfactants include betaines, including alkyl dimethyl betaine and cocodimethyl amidopropyl betaine, $C_8$ to $C_{18}$ (for example from $C_{12}$ to $C_{18}$) amine oxides, and sulfo and hydroxy betaines, such as N-alkyl-N,N-dimethylammino-1-propane sulfonate where the alkyl group can be $C_8$ to $C_{18}$. Amine oxides may be preferred for performance reasons.

The compositions disclosed herein may comprise an amphoteric surfactant. Examples of amphoteric surfactants include aliphatic derivatives of secondary or tertiary amines, or aliphatic derivatives of heterocyclic secondary and tertiary amines in which the aliphatic radical may be straight or branched-chain and where one of the aliphatic substituents contains at least about 8 carbon atoms, or from about 8 to about 18 carbon atoms, and at least one of the aliphatic substituents contains an anionic water-solubilizing group, e.g. carboxy, sulfonate, sulfate. Suitable amphoteric surfactants also include sarcosinates, glycinates, taurinates, and mixtures thereof.

Population of Capsules

The liquid fabric care compositions of the present disclosure further include a population of capsules. As described in more detail below, the capsules may include a core surrounded by substantially inorganic shell.

The capsules may be present in the composition in an amount that is from about 0.05% to about 20%, or from about 0.05% to about 10%, or from about 0.1% to about 5%, or from about 0.2% to about 2%, by weight of the composition. The composition may comprise a sufficient amount of capsules to provide from about 0.05% to about 10%, or from about 0.1% to about 5%, or from about 0.1% to about 2%, by weight of the composition, of perfume raw materials to the composition. When discussing herein the amount or weight percentage of the capsules, it is meant the sum of the shell material and the core material.

The capsules can have a mean shell thickness of 10 nm to 10,000 nm, preferably 170nm to 1000 nm, more preferably 300 nm to 500 nm.

The capsules can have a mean volume weighted capsule diameter of 0.1 micrometers to 300 micrometers, preferably 10 micrometers to 200 micrometers, more preferably 10 micrometers to 50 micrometers. It has been advantageously found that large capsules (e.g., mean diameter of 10 μm or greater) can be provided in accordance with embodiments herein without sacrificing the stability of the capsules as a whole and/or while maintaining good fracture strength.

It has surprisingly been found that in addition to the inorganic shell, the volumetric core-shell ratio can play an important role to ensure the physical integrity of the capsules. Shells that are too thin vs. the overall size of the capsule (core:shell ratio>98:2) tend to suffer from a lack of self-integrity. On the other hand, shells that are extremely thick vs. the diameter of the capsule (core:shell ratio<80:20) tend to have higher shell permeability in a surfactant-rich matrix. While one might intuitively think that a thick shell leads to lower shell permeability (since this parameter impacts the mean diffusion path of the active across the shell), it has surprisingly been found that the capsules of this invention that have a shell with a thickness above a threshold have higher shell permeability. It is believed that this upper threshold is, in part, dependent on the capsule diameter.

Volumetric core-shell ratio is determined according to the method provided in the Test Method section below.

The capsules may have a volumetric core-shell ratio of 50:50 to 99:1, preferably from 60:40 to 99:1, preferably 70:30 to 98:2, more preferably 80:20 to 96:4.

It may be desirable to have particular combinations of these capsule characteristics. For example, the capsules can have a volumetric core-shell ratio of about 99:1 to about 50:50, and have a mean volume weighted capsule diameter of about 0.1 lam to about 200 μm, and a mean shell thickness of about 10 nm to about 10,000 nm. The capsules can have a volumetric core-shell ratio of about 99:1 to about 50:50, and have a mean volume weighted capsule diameter of about 10 μm to about 200 μm, and a mean shell thickness of about 170 nm to about 10,000 nm. The capsules can have a volumetric core-shell ratio of about 98:2 to about 70:30, and have a mean volume weighted capsule diameter of about 10 lam to about 100 μm, and a mean shell thickness of about 300 nm to about 1000 nm.

Methods according to the present disclosure can produce capsule having a low coefficient of variation of capsule diameter. Control over the distribution of size of the capsules can beneficially allow for the population to have improved and more uniform fracture strength. A population of capsules can have a coefficient of variation of capsule diameter of 40% or less, preferably 30% or less, more preferably 20% or less.

For capsules containing a core material to perform and be cost-effective in consumer goods applications, such as liquid detergent or liquid fabric softener, they should: i) be resistant to core diffusion during the shelf life of the liquid product (e.g., low leakage or permeability); ii) have ability to deposit on the targeted surface during application (e.g. washing machine cycle); and iii) be able to release the core material by mechanical shell rupture at the right time and place to provide the intended benefit for the end consumer.

The capsules described herein can have an average fracture strength of 0.1 MPa to 10 MPa, preferably 0.25 MPa to 5 MPa, more preferably 0.25 MPa to 3 MPa. Fully inorganic capsules have traditionally had poor fracture strength, whereas for the capsules described herein, the fracture strength of the capsules can be greater than 0.25 MPa, providing for improved stability and a triggered release of the benefit agent upon a designated amount of rupture stress.

It may be preferred that the mean volume weighted diameter of the capsules is between 1 and 200 micrometers, preferably between 1 and 10 micrometers, even more preferably between 2 and 8 micrometers. It may be preferred that the shell thickness is between 1 and 10000 nm, preferably between 1 and 1000 nm, more preferably between 10 and 200 nm. It may be preferred that the capsules have a mean volume weighted diameter between 1 and 10 micrometers and a shell thickness between 1 and 200 nm. It has been found that capsules with a mean volume weighted diameter between 1 and 10 micrometers and a shell thickness between 1 and 200 nm can have a higher Fracture Strength.

Without intending to be bound by theory, it is believed that the higher Fracture strength provides a better survivability during the laundering process, as the process can cause premature rupture of mechanically weak capsules due to the mechanical constraints in the washing machine.

It's believed that capsules having a mean volume weighted diameter between 1 and 10 micrometers and a shell thickness between 10 and 200 nm can offer resistance to mechanical constraints, particularly when made with a certain selection of the silica precursor used. It may be preferred that the precursor has a molecular weight between 2 and 5 kDa, even more preferably a molecular weight between 2.5 and 4 kDa. In addition, the concentration of the precursor can be carefully selected, for example so that the concentration is between 20 and 60 wt %, preferably between 40 and 60wt %, of the oil phase used during the encapsulation process.

Without intending to be bound by theory, it is believed that higher molecular weight precursors have a slower migration time from the oil phase into the water phase. The slower migration time is believed to arise from the combination of three phenomenon: diffusion, partitioning, and reaction kinetics. This phenomenon can be important in the context of small sized capsules, for example due to the fact that the overall surface area between oil and water in the system increases as the capsule diameter decreases. A higher surface area can lead to higher migration of the precursor from the oil phase to the water phase, which in turn can reduce the yield of polymerization at the interface. Therefore, the higher molecular weight precursors may be useful to mitigate the effects brought by an in increase in surface area, and to obtain capsules according to the present disclosure.

In addition to the freshness/perfume-delivery benefits provided by capsules according to the present disclosure, it is further believed that fabric treatment compositions according to the present disclosure, which will include such capsules, can provide softness/hand-feel benefits to fabrics. It is typically advantageous to have two benefits, such as freshness and feel benefits, being provided by a single ingredient, as this can lead to cost savings, reduction of manufacturing complexity, and formulation efficiencies. Such ingredients may be particularly useful in products where one or both benefits are typically expected by the consumer, such as in a liquid laundry detergent, a fabric enhancer, or a laundry additive in the form of a bead or pastille.

i. Core

The capsules include a core. The core may be oil-based, or the core may be aqueous. Preferably, the core is oil-based. The core may be a liquid at the temperature at which it is utilized in a formulated product. The core may be a liquid at and around room temperature.

The core includes perfume. The core may comprise from about 1 wt % to 100 wt % perfume, based on the total weight of the core. Preferably, the core can include 50 wt % to 100 wt % perfume based on the total weight of the core, more preferably 80 wt % to 100 wt % perfume based on the total weight of the core. Typically, higher levels of perfume are preferred for improved delivery efficiency.

The perfume may comprise one or more, preferably two or more, perfume raw materials. The term "perfume raw material" (or "PRM") as used herein refers to compounds having a molecular weight of at least about 100 g/mol and which are useful in imparting an odor, fragrance, essence, or scent, either alone or with other perfume raw materials. Typical PRMs comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partitioning coefficient (P), which may be described in terms of logP, determined according to the test method described in Test methods section. Based on these characteristics, the PRMs may be categorized as Quadrant I, Quadrant II, Quadrant III, or Quadrant IV perfumes, as described in more detail below. A perfume having a variety of PRMs from different quadrants may be desirable, for example, to provide fragrance benefits at different touchpoints during normal usage.

Perfume raw materials having a boiling point B.P. lower than about 250° C. and a logP lower than about 3 are known as Quadrant I perfume raw materials. Quadrant 1 perfume raw materials are preferably limited to less than 30% of the perfume composition. Perfume raw materials having a B.P. of greater than about 250° C. and a logP of greater than about 3 are known as Quadrant IV perfume raw materials, perfume raw materials having a B.P. of greater than about 250° C. and a logP lower than about 3 are known as Quadrant II perfume raw materials, perfume raw materials having a B.P. lower than about 250° C. and a logP greater than about 3 are known as a Quadrant III perfume raw materials. Suitable Quadrant I, II, III and IV perfume raw materials are disclosed in U.S. Pat. No. 6,869,923 B1.

The perfume micro-capsule comprises a perfume. Preferably, the perfume of the microcapsule comprises a mixture of at least 3, or even at least 5, or at least 7 perfume raw materials. The perfume of the micro-capsule may comprise at least 10 or at least 15 perfume raw materials. A mixture of perfume raw materials may provide more complex and desirable aesthetics, and/or better perfume performance or longevity, for example at a variety of touchpoints. However, it may be desirable to limit the number of perfume raw materials in the perfume to reduce or limit formulation complexity and/or cost.

The perfume may comprise at least one perfume raw material that is naturally derived. Such components may be desirable for sustainability/environmental reasons. Naturally derived perfume raw materials may include natural extracts or essences, which may contain a mixture of PRMs. Such natural extracts or essences may include orange oil, lemon oil, rose extract, lavender, musk, patchouli, balsamic essence, sandalwood oil, pine oil, cedar, and the like.

The core may comprise, in addition to perfume raw materials, a pro-perfume, which can contribute to improved longevity of freshness benefits. Pro-perfumes may comprise nonvolatile materials that release or convert to a perfume material as a result of, e.g., simple hydrolysis, or may be pH-change-triggered pro-perfumes (e.g. triggered by a pH drop) or may be enzymatically releasable pro-perfumes or light-triggered pro-perfumes. The pro-perfumes may exhibit varying release rates depending upon the pro-perfume chosen.

The core of the encapsulates of the present disclosure may comprise a core modifier, such as a partitioning modifier and/or a density modifier. The core may comprise, in addition to the perfume, from greater than 0% to 80%, preferably from greater than 0% to 50%, more preferably from greater than 0% to 30% based on total core weight, of a core modifier. The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or consist of isopropyl myristate. The modified vegetable oil may be esterified and/or brominated. The modified vegetable oil may preferably comprise castor oil and/or soy bean oil. US Patent Application Publication 20110268802, incorporated herein by reference, describes other partitioning modifiers that may be useful in the presently described perfume encapsulates.

ii. Shell

The capsules of the present disclosure include a shell that surrounds the core.

The shell may include a first shell component. The shell may preferably include a second shell component that surrounds the first shell component. The first shell component can include a condensed layer formed from the condensation product of a precursor. As described in detail below, the precursor can include one or more precursor compounds. The first shell component can include a nanoparticle layer. The second shell component can include inorganic materials.

The shell may be substantially inorganic (defined later). The substantially inorganic shell can include a first shell component comprising a condensed layer surrounding the core and may further comprise a nanoparticle layer surrounding the condensed layer. The substantially inorganic shell may further comprise a second shell component surrounding the first shell component. The first shell component comprises inorganic materials, preferably metal/semi-metal oxides, more preferably SiO2, TiO2 and Al2O3, and even more preferably $SiO_2$. The second shell component comprises inorganic material, preferably comprising materials from the groups of Metal/semi-metal oxides, metals and minerals, more preferably materials chosen from the list of $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, and copper, even more preferably chosen from $SiO_2$ and $CaCO_3$. Preferably, the second shell component material is of the same type of chemistry as the first shell component in order to maximize chemical compatibility.

The first shell component can include a condensed layer surrounding the core. The condensed layer can be the condensation product of one or more precursors. The one or more precursors may comprise at least one compound from the group consisting of Formula (I), Formula (II), and a mixture thereof, wherein Formula (I) is $(M^vO_zY_n)_w$, and wherein Formula (II) is $(M^vO_zY_nR^1{}_p)_w$. It may be preferred that the precursor comprises only Formula (I) and is free of compounds according to Formula (II), for example so as to reduce the organic content of the capsule shell (i.e., no $R^1$ groups). Formulas (I) and (II) are described in more detail below.

The one or more precursors can be of Formula (I):

$$(M^vO_zY_n)_w \quad \text{(Formula I)},$$

where M is one or more of silicon, titanium and aluminum, v is the valence number of M and is 3 or 4, z is from 0.5 to 1.6, preferably 0.5 to 1.5, each Y is independently selected from —OH, —$OR^2$, —$NH_2$, —$NHR_2$,—$N(R^2)_2$, wherein $R^2$ is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0.7 to (v-1), and w is from 2 to 2000.

The one or more precursors can be of Formula (I) where M is silicon. It may be that Y is —$OR^2$. It may be that n is 1 to 3. It may be preferable that Y is —$OR^2$ and n is 1 to 3. It may be that n is at least 2, one or more of Y is —$OR^2$, and one or more of Y is —OH.

$R^2$ may be $C_1$ to $C_{20}$ alkyl. $R^2$ may be $C_6$ to $C_{22}$ aryl. $R^2$ may be one or more of $C_1$ alkyl, $C_2$ alkyl, $C_3$ alkyl, $C_4$ alkyl, $C_5$ alkyl, $C_6$ alkyl, $C_7$ alkyl, and $C_8$ alkyl. $R^2$ may be $C_1$ alkyl. $R^2$ may be $C_2$ alkyl. $R^2$ may be $C_3$ alkyl. $R^2$ may be $C_4$ alkyl.

It may be that z is from 0.5 to 1.3, or from 0.5 to 1.1, 0.5 to 0.9, or from 0.7 to 1.5, or from 0.9 to 1.3, or from 0.7 to 1.3.

It may be preferred that M is silicon, v is 4, each Y is —$OR^2$, n is 2 and/or 3, and each $R^2$ is $C_2$ alkyl.

The precursor can include polyalkoxysilane (PAOS). The precursor can include polyalkoxysilane (PAOS) synthesized via a hydrolytic process.

The precursor can alternatively or further include one or more of a compound of Formula $$(M^vO_zY_nR^1_p)_w \qquad \text{(Formula II)},$$

where M is one or more of silicon, titanium and aluminum, v is the valence number of M and is 3 or 4, z is from 0.5 to 1.6, preferably 0.5 to 1.5, each Y is independently selected from —OH, —$OR^2$, —$NH_2$, —$NHR^2$, —$N(R^2)_2$, wherein $R^2$ is selected from a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S; n is from 0 to (v-1); each $R^1$ is independently selected from the group consisting of: a $C_1$ to $C_{30}$ alkyl; a $C_1$ to $C_{30}$ alkylene; a $C_1$ to $C_{30}$ alkyl substituted with a member (e.g., one or more) selected from the group consisting of a halogen, —$OCF_3$, —$NO_2$, —CN, —NC, —OH, —OCN, —NCO, alkoxy, epoxy, amino, mercapto, acryloyl, —C(O)OH, —C(O)O-alkyl, —C(O)O-aryl, —C(O)O-heteroaryl, and mixtures thereof; and a $C_1$ to $C_{30}$ alkylene substituted with a member selected from the group consisting of a halogen, —$OCF_3$, —$NO_2$, —CN, —NC, —OH, —OCN, —NCO, alkoxy, epoxy, amino, mercapto, acryloyl, —C(O)OH, —C(O)O-alkyl, —C(O)O-aryl, and —C(O)O-heteroaryl; and p is a number that is greater than zero and is up to pmax, where $pmax=60/[9*Mw(R^1)+8]$, where $Mw(R^1)$ is the molecular weight of the $R^1$ group, and where w is from 2 to 2000.

$R^1$ may be a $C_1$ to $C_{30}$ alkyl substituted with one to four groups independently selected from a halogen, —$OCF_3$, —$NO_2$, —CN, —NC, —OH, —OCN, —NCO, alkoxy, epoxy, amino, mercapto, acryloyl, $CO_2H$ (ie, C(O)OH), —C(O)O-alkyl, —C(O)O-aryl, and —C(O)O-heteroaryl. $R^1$ may be a $C_1$ to $C_{30}$ alkylene substituted with one to four groups independently selected from a halogen, —$OCF_3$, —$NO_2$, —CN, —NC, —OH, —OCN, —NCO, alkoxy, epoxy, amino, mercapto, acryloyl, $CO_2H$, —C(O)O-alkyl, —C(O)O-aryl, and —C(O)O-heteroaryl.

As indicated above, to reduce or even eliminate organic content in the first shell component, it may be preferred to reduce, or even eliminate, the presence of compounds according to Formula (II), which has R1 groups. The precursor, the condensed layer, the first shell component, and/or the shell may be free of compounds according to Formula (II).

The precursors of formula (I) and/or (II) may be characterized by one or more physical properties, namely a molecular weight (Mw), a degree of branching (DB) and a polydispersity index (PDI) of the molecular weight distribution. It is believed that selecting particular Mw and/or DB can be useful to obtain capsules that hold their mechanical integrity once left drying on a surface and that have low shell permeability in surfactant-based matrices. The precursors of formula (I) and (II) may be characterized as having a DB between 0 and 0.6, preferably between 0.1 and 0.5, more preferably between 0.19 and 0.4., and/or a Mw between 600 Da and 100000 Da, preferably between 700 Da and 60000 Da, more preferably between 1000 Da and 30000 Da. The characteristics provide useful properties of said precursor in order to obtain capsules of the present invention. The precursors of formula (I) and/or (II) can have a PDI between 1 and 50.

The condensed layer comprising metal/semi-metal oxides may be formed from the condensation product of a precursor comprising at least one compound of formula (I) and/or at least one compound of formula (II), optionally in combination with one or more monomeric precursors of metal/semi-metal oxides, wherein said metal/semi-metal oxides comprise TiO2, Al2O3 and SiO2, preferably SiO2. The monomeric precursors of metal/semi-metal oxides may include compounds of the formula $M(Y)_{V-n}R_n$ wherein M, Y and R are defined as in formula (II), and n can be an integer between 0 and 3. The monomeric precursor of metal/semi-metal oxides may be preferably of the form where M is Silicon wherein the compound has the general formula $Si(Y)_{4-n}R_n$ wherein Y and R are defined as for formula (II) and n can be an integer between 0 and 3. Examples of such monomers are TEOS (tetraethoxy orthosilicate), TMOS (tetramethoxy orthosilicate), TBOS (tetrabutoxy orthosilicate), triethoxymethylsilane (TEMS), diethoxy -dimethylsilane (DEDMS), trimethylethoxysilane (TMES), and tetraacetoxysilane (TAcS). These are not meant to be limiting the scope of monomers that can be used and it would be apparent to the person skilled in the art what are the suitable monomers that can be used in combination herein.

The first shell components can include an optional nanoparticle layer. The nanoparticle layer comprises nanoparticles. The nanoparticles of the nanoparticle layer can be one or more of $SiO_2$, $TiO_2$, $Al_2O_3$, $ZrO_2$, $ZnO_2$, $CaCo_3$, clay, silver, gold, and copper. Preferably, the nanoparticle layer can include $SiO_2$ nanoparticles.

The nanoparticles can have an average diameter between 1 nm and 500 nm, preferably between 50 nm and 400 nm.

The pore size of the capsules can be adjusted by varying the shape of the nanoparticles and/or by using a combination of different nanoparticle sizes. For example, non-spherical irregular nanoparticles can be used as they can have improved packing in forming the nanoparticle layer, which is believed to yield denser shell structures. This can be advantageous when limited permeability is required. The nanoparticles used can have more regular shapes, such as spherical. Any contemplated nanoparticle shape can be used herein.

The nanoparticles can be substantially free of hydrophobic modifications. The nanoparticles can be substantially free of organic compound modifications. The nanoparticles can include an organic compound modification. The nanoparticles can be hydrophilic.

The nanoparticles can include a surface modification such as but not limited to linear or branched $C_1$ to $C_{20}$ alkyl groups, surface amino groups, surface methacrylo groups, surface halogens, or surface thiols. These surface modifications are such that the nanoparticle surface can have covalently bound organic molecules on it. When it is disclosed in this document that inorganic nanoparticles are used, this is meant to include any or none of the aforementioned surface modifications without being explicitly called out.

The capsules of the present disclosure may be defined as comprising a substantially inorganic shell comprising a first shell component and a second shell component. By substantially inorganic it is meant that the first shell component can comprise up to 10 wt %, or up to 5 wt % of organic content, preferably up to 1 wt % of organic content, as defined later in the organic content calculation. It may be preferred that the first shell component, the second shell component, or both comprises no more than about 5 wt %, preferably no more than about 2wt %, more preferably about 0 wt %, of organic content, by weight of the first or shell component, as the case may be.

While the first shell component is useful to build a mechanically robust scaffold or skeleton, it can also provide low shell permeability in liquid products containing surfactants such as laundry detergents, shower-gels, cleansers, etc. (see Surfactants in Consumer Products, J. Falbe, Springer-Verlag). The second shell component can greatly reduce the shell permeability, which improves the capsule impermeability in surfactant-based matrices. A second shell component can also greatly improve capsule mechanical properties, such as a capsule rupture force and fracture strength. Without intending to be bound by theory, it is believed that a second shell component contributes to the densification of the overall shell by depositing a precursor in pores remaining in the first shell component. A second shell component also adds an extra inorganic layer onto the surface of the capsule. These improved shell permeabilities and mechanical properties provided by the $2^{nd}$ shell component only occur when used in combination with the first shell component as defined in this invention.

More detailed descriptions of the shell structure, their materials and how these interact with each other to provide optimal performance can be found in U.S. patent application Ser. Nos. 16/851173, 16/851176, and 16/851194, whose disclosures in their entirety are incorporated herein by reference.

iii. Process of Making Capsules

Capsules of the present disclosure may be formed by first admixing a hydrophobic material with any of the precursors of the condensed layer as defined above, thus forming the oil phase, wherein the oil phase can include an oil-based and/or oil-soluble precursor. Said precursor/hydrophobic material mixture is then either used as a dispersed phase or as a continuous phase in conjunction with a water phase, where in the former case an O/W (oil-in-water) emulsion is formed and in the latter a W/O (water-in-oil) emulsion is formed once the two phases are mixed and homogenized via methods that are known to the person skilled in the art. Preferably, an O/W emulsion is formed. Nanoparticles can be present in the water phase and/or the oil phase, irrespective of the type of emulsion that is desired. The oil phase can include an oil-based core modifier and/or an oil-based benefit agent and a precursor of the condensed layer. Suitable core materials to be used in the oil phase are described earlier in this document.

Once either emulsion is formed, the following steps may occur:

(a) the nanoparticles migrate to the oil/water interface, thus forming the nanoparticle layer.

(b) The precursor of the condensed layer comprising precursors of metal/semi-metal oxides will start undergoing a hydrolysis/condensation reaction with the water at the oil/water interface, thus forming the condensed layer surrounded by the nanoparticle layer. The precursors of the condensed layer can further react with the nanoparticles of the nanoparticle layer.

The precursor forming the condensed layer can be present in an amount between 1 wt % and 50 wt %, preferably between 10 wt % and 40 wt % based on the total weight of the oil phase.

The oil phase composition can include any compounds as defined in the core section above. The oil phase, prior to emulsification, can include between 10 wt % to about 99 wt % benefit agent.

In the method of making capsules according to the present disclosure, the oil phase may be the dispersed phase, and the continuous aqueous (or water) phase can include water, an acid or base, and nanoparticles. The aqueous (or water) phase may have a pH between 1 and 11, preferably between 1 and 7 at least at the time of admixing both the oil phase and the aqueous phase together. The acid can be a strong acid. The strong acid can include one or more of HCl, $HNO_3$, $H_2SO_4$, HBr, HI, $HClO_4$, and $HClO_3$, preferably HCl. The acid can be a weak acid. The weak acid can be acetic acid or HF. The concentration of the acid in the continuous aqueous phase can be between $10^{-7}$M and 5M. The base can be a mineral or organic base, preferably a mineral base. The mineral base can be a hydroxide, such as sodium hydroxide and ammonia. For example, the mineral base can be about $10^{-5}$ M to 0.01M NaOH, or about $10^{-5}$ M to about 1M ammonia. The list of acids and bases and their concentration ranges exemplified above is not meant to be limiting the scope of the invention, and other suitable acids and bases that allow for the control of the pH of the continuous phase are contemplated herein.

In the method of making the capsules according to the present disclosure, the pH can be varied throughout the process by the addition of an acid and/or a base. For example, the method can be initiated with an aqueous phase at an acidic or neutral pH and then a base can be added during the process to increase the pH. Alternatively, the method can be initiated with an aqueous phase at a basic or neutral pH and then an acid can be added during the process to decrease the pH. Still further, the method can be initiated with an aqueous phase at an acid or neutral pH and an acid can be added during the process to further reduce the pH. Yet further the method can be initiated with an aqueous phase at a basic or neutral pH and a base can be added during the process to further increase the pH. Any suitable pH shifts can be used. Further any suitable combinations of acids and bases can be used at any time in the method to achieve a desired pH. Any of the nanoparticles described above can be used in the aqueous phase. The nanoparticles can be present in an amount of about 0.01 wt % to about 10 wt % based on the total weight of the aqueous phase.

The method can include admixing the oil phase and the aqueous phase in a ratio of oil phase to aqueous phase of about 1:10 to about 1:1.

The second shell component can be formed by admixing capsules having the first shell component with a solution of second shell component precursor. The solution of second shell component precursor can include a water soluble or oil soluble second shell component precursor. The second shell component precursor can be one or more of a compound of formula (I) as defined above, tetraethoxysilane (TEOS), tetramethoxysilane (TMOS), tetrabutoxysilane (TBOS), triethoxymethylsilane (TEMS), diethoxy-dimethylsilane (DEDMS), trimethylethoxysilane (TMES), and tetraacetoxysilane (TAcS). The second shell component precursor can also include one or more of silane monomers of type $Si(Y)_{4-n}R_n$ wherein Y is a hydrolysable group, R is a non-hydrolysable group, and n can be an integer between 0 and 3. Examples of such monomers are given earlier in this paragraph, and these are not meant to be limiting the scope of monomers that can be used. The second shell component precursor can include salts of silicate, titanate, aluminate, zirconate and/or zincate. The second shell component precursor can include carbonate and calcium salts. The second shell component precursor can include salts of iron, silver, copper, nickel, and/or gold. The second shell component precursor can include zinc, zirconium, silicon, titanium, and/or aluminum alkoxides. The second shell component precursor can include one or more of silicate salt solutions such as sodium silicates, silicon tetralkoxide solutions, iron sulfate salt and iron nitrate salt, titanium alkoxides solutions, aluminum trialkoxide solutions, zinc dialkoxide solutions, zirconium alkoxide solutions, calcium salt solution, carbonate salt solution. A second shell component comprising $CaCO_3$ can be obtained from a combined use of calcium salts and carbonate salts. A second shell component comprising $CaCO_3$ can be obtained from Calcium salts without addition of carbonate salts, via in-situ generation of carbonate ions from $CO_2$.

The second shell component precursor can include any suitable combination of any of the foregoing listed compounds.

The solution of second shell component precursor can be added dropwise to the capsules comprising a first shell component. The solution of second shell component precursor and the capsules can be mixed together between 1 minute and 24 hours. The solution of second shell component precursor and the capsules can be mixed together at room temperature or at elevated temperatures, such as 20° C. to 100° C.

The second shell component precursor solution can include the second shell component precursor in an amount between 1 wt % and 50 wt % based on the total weight of the solution of second shell component precursor Capsules with a first shell component can be admixed with the solution of the second shell component precursor at a pH of between 1 and 11. The solution of the second shell precursor can contain an acid and/or a base. The acid can be a strong acid. The strong acid can include one or more of HCl, $HNO_3$, $H_2SO_4$, HBr, HI, $HClO_4$, and $HClO_3$, preferably HCl. In other embodiments, the acid can be a weak acid. In embodiments, said weak acid can be acetic acid or HF. The concentration of the acid in the second shell component precursor solution can be between $10^{-7}$ M and 5M. The base can be a mineral or organic base, preferably a mineral base. The mineral base can be a hydroxide, such as sodium hydroxide and ammonia. For example, the mineral base can be about $10^{-5}$ M to 0.01M NaOH, or about $10^{-5}$ M to about 1M ammonia. The list of acids and bases exemplified above is not meant to be limiting the scope of the invention, and other suitable acids and bases that allow for the control of the pH of the second shell component precursor solution are contemplated herein.

The process of forming a second shell component can include a change in pH during the process. For example, the process of forming a second shell component can be initiated at an acidic or neutral pH and then a base can be added during the process to increase the pH. Alternatively, the process of forming a second shell component can be initiated at a basic or neutral pH and then an acid can be added during the process to decrease the pH. Still further, the process of forming a second shell component can be initiated at an acid or neutral pH and an acid can be added during the process to further reduce the pH. Yet further the process of forming a second shell component can be initiated at a basic or neutral pH and a base can be added during the process to further increase the pH. Any suitable pH shifts can be used. Further any suitable combinations of acids and bases can be used at any time in the solution of second shell component precursor to achieve a desired pH. The process of forming a second shell component can include maintaining a stable pH during the process with a maximum deviation of +/−0.5 pH unit. For example, the process of forming a second shell component can be maintained at a basic, acidic or neutral pH. Alternatively, the process of forming a second shell component can be maintained at a specific pH range by controlling the pH using an acid or a base. Any suitable pH range can be used. Further any suitable combinations of acids and bases can be used at any time in the solution of second shell component precursor to keep a stable pH at a desirable range.

More detailed descriptions of the method of making the capsules and the relevant properties of all shell component precursors (i.e. condensed layer precursors, nanoparticles and second shell component precursors) can be found in U.S. patent application Ser. Nos. 16/851173, 16/851176, and 16/851194, whose disclosures in their entirety are defining the method of making of the capsules of the present invention.

Whether making an oil-based core or aqueous core, the emulsion can be cured under conditions to solidify the precursor thereby forming the shell surrounding the core.

The reaction temperature for curing can be increased in order to increase the rate at which solidified capsules are obtained. The curing process can induce condensation of the precursor. The curing process can be done at room temperature or above room temperature. The curing process can be done at temperatures 30° C. to 150° C., preferably 50° C. to 120° C., more preferably 80° C. to 100° C. The curing process can be done over any suitable period to enable the capsule shell to be strengthened via condensation of the precursor material. The curing process can be done over a period from 1 minute to 45 days, preferably 1 hour to 7 days, more preferably 1 hour to 24hours. Capsules are considered cured when they no longer collapse. Determination of capsule collapse is detailed below. During the curing step, it is believed that hydrolysis of Y moieties (from formula (I) and/or (II)) occurs, followed by the subsequent condensation of a —OH group with either another —OH group or another moiety of type Y (where the 2 Y moieties are not necessarily the same). The hydrolysed precursor moieties will initially condense with the surface moieties of the nanoparticles (provided they contain such moieties). As the shell formation progresses, the precursor moieties will react with said preformed shell.

The emulsion can be cured such that the shell precursor undergoes condensation. The emulsion can be cured such that the shell precursor reacts with the nanoparticles to undergo condensation. Shown below are examples of the hydrolysis and condensation steps described herein for silica-based shells:

Hydrolysis: $\equiv Si—OR+H_2O \rightarrow \equiv Si—OH+ROH$

Condensation: $\equiv Si—OH+\equiv Si—OR \rightarrow \equiv Si—O—Si\equiv +ROH$ $\equiv Si—OH+\equiv Si—OH \rightarrow \equiv Si—O—Si\equiv +H_2O$ For example, when a precursor of formula (I) or (II) is used, the following describes the hydrolysis and condensation steps:

Hydrolysis: $\equiv M—Y+H_2O \rightarrow \equiv M—OH+YH$

Condensation: $\equiv M—OH+\equiv M—Y \rightarrow \equiv M—O—M\equiv +YH$ $\equiv M—OH+\equiv M—OH \rightarrow \equiv M—O—M\equiv +H_2O$ The capsules may be provided as a slurry composition (or simply "slurry" herein). The result of the methods described herein may be a slurry containing the capsules. The slurry can be formulated into a product, such as a consumer product.

Adjunct Ingredients

The liquid fabric care compositions of the present disclosure may comprise one or more adjunct ingredients in addition to the conditioning agents and perfume capsules described above. The adjunct ingredients may be selected at appropriate levels to facilitate improved performance, processing, and/or aesthetics. The one or more adjunct ingredients may be selected from processing aids, perfume delivery systems, structurants, rheology modifiers, other adjuncts, or mixtures thereof. Several of these adjuncts are discussed in more detail below.

Processing Aids

The composition can include one or more processing aids. The processing aids can include one or more of aggregate inhibiting materials (such as divalent salts) and particle suspending polymers. The aggregate inhibiting materials can include salts that can have a charge-shielding effect around the capsule, such as magnesium chloride, calcium chloride, magnesium bromide, and magnesium sulfate. The composition can further include one or more of xanthan gum, carrageenan gum, guar gum, shellac, alginates, chitosan; cellulosic materials such as carboxymethyl cellulose, hydroxypropyl methyl cellulose, cationic cellulosic materials; polyacrylic acid; polyvinyl alcohol; hydrogenated castor oil; and ethylene glycol distearate. The composition can include one or more carriers. The one or more carriers may be polar solvents, nonpolar solvents, or mixtures thereof. Polar solvents may include water, ethylene glycol, propylene glycol, polyethylene glycol, and glycerol; nonpolar solvents may include mineral oil, silicone oils, and hydrocarbon paraffin oils.

Additional Perfume Delivery Systems

In addition to the capsules of the present disclosure, the composition may comprise one or more additional perfume delivery systems. The additional perfume delivery system may comprise free perfume, pro-perfumes, other perfume capsules (for example core-shell capsules that include greater than 5 wt % of organic material in the shell), and mixtures thereof.

To fight the malodor associated with damp fabric, it may be particularly effective that the perfume delivery system comprises free (e.g., unencapsulated) perfume. The composition may comprise from 0.01% to 10%, or from 0.1% to 5%, or even from 0.2% to 2% by weight of free perfume. The composition may comprise at least 0.75% or at least 1%, by weight of the composition, of free perfume. Preferably, the free perfume comprises a mixture of at least 3, or even at least 5, or at least 7, or at least 10, or at least 15 perfume raw materials.

The compositions of the present disclosure may comprise a pro-perfume, which can contribute to improved longevity of freshness benefits. Pro-perfumes may comprise nonvolatile materials that release or convert to a perfume material as a result of, e.g., simple hydrolysis, or may be pH-change-triggered pro-perfumes (e.g. triggered by a pH drop) or may be enzymatically releasable pro-perfumes, or light-triggered pro-perfumes. The pro-perfumes may exhibit varying release rates depending upon the pro-perfume chosen.

The composition may comprise other perfume capsules. These capsules may be core-shell capsules and may include more than 5 wt % organic material in the shell, by weight of the shell material. Such capsules may be considered "organic" capsules in the present disclosure in order to differentiate them from the inorganic capsules described and claimed herein. The shell material of the organic capsules may comprise a material, preferably a polymeric material, derived from melamine, polyacrylamide, silicones, polystyrene, polyurea, polyurethanes, polyacrylate based materials, gelatin, styrene malic anhydride, polyamides, and mixtures thereof. The organic capsules may be coated with a deposition aid, a cationic polymer, a non-ionic polymer, an anionic polymer, or mixtures thereof. Suitable deposition polymers may be selected from the group consisting of: polyvinylformaldehyde, partially hydroxylated polyvinylformaldehyde, polyvinylamine, polyethyleneimine, ethoxylated polyethyleneimine, polyvinylalcohol, polyacrylates, cationic polysaccharides (such as chitosan), and combinations thereof. The organic capsules may have a volume-weighted mean particle size from about 0.5 microns to about 100 microns, preferably from about 1 microns to about 60 microns, or alternatively a volume weighted mean particle size from about, from about 25 microns to about 60 microns, more preferably from about 25 microns to about 60 microns.

Rheology Modifier/Structurant

The compositions of the present disclosure may contain a rheology modifier and/or a structurant. Rheology modifiers may be used to "thicken" or "thin" liquid compositions to a desired viscosity. Structurants may be used to facilitate phase stability and/or to suspend or inhibit aggregation of particles in liquid composition, such as the encapsulates as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and $C_1$-$C_{30}$ alkyl ester of the (meth)acrylic acid. Such copolymers are available from Noveon Inc. under the tradename Carbopol Aqua 30. Another suitable structurant is sold under the tradename Rheovis CDE, available from BASF.

The structurant may be in the form of a structurant system, comprising more than one structurant material. For example, the structurant system may be in the form of a polysaccharide system. Preferable polysaccharides include xanthan gum, glucomannan, galactomannan, and combinations thereof. The glucomannan may be derived from a natural gum such as konjac gum. The galactomannan may be derived from naturals gums such as locust bean gum. Polysaccharides may also include carrageenan. The xanthan gum may be modified such as by deacetylation. The polysaccharide may comprise comprising at least two polysaccharides, such as a first polysaccharide and a second polysaccharide. The first polysaccharide may be xanthan gum. The second polysaccharide may be selected from the group consisting of glucomannan, galactomannan, and combinations thereof. The second polysaccharide may be selected from the group consisting of konjac gum, locust bean gum, and combinations thereof. Preferably, the first polysaccharide is xanthan gum, and the second polysaccharide is konjac gum. Such polysaccharide systems may be particularly useful in sprayable products. When the composition is in the form of a sprayable product, the total concentration of polysaccharide present in the liquid composition may be less than about 0.5 wt. %, or preferably less than about 0.2 wt. %, or preferably less than about 0.1 wt. %, more preferably less than 0.08 wt. %, and most preferably less than 0.06 wt. %. Without wishing to be bound by theory, it is believed that minimizing the total polysaccharide level present in the sprayable composition diminishes residue and/or optimizes spray characteristics.

Other Adjuncts

The fabric care compositions of the present disclosure may contain other adjuncts that are suitable for inclusion in the product and/or for final usage. For example, the fabric care compositions may comprise cationic polymers, cleaning polymers, enzymes, solvents, emulsifiers, suds supressors, dyes, hueing agents, brighteners, chelants, or combinations thereof.

Process of Making

The present disclosure relates to processes for making any of the liquid fabric care compositions described herein. The process of making a liquid fabric care composition, which may be a liquid fabric enhancer, may comprise the step of combining a capsule as described herein with a fabric treatment adjunct. The fabric treatment adjunct may be part of a liquid base composition. The process may include the step of providing a liquid base composition comprising a member selected from the group consisting of a fabric treatment adjunct, water, and mixtures thereof. The capsules may be combined with the liquid base composition.

The liquid fabric care compositions of the present disclosure can be formulated into any suitable form and prepared by any process chosen by the formulator. The fabric treatment adjuncts, the capsules, and other adjuncts, if any, may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, plough shear mixers, ribbon blenders, vertical axis granulators and drum mixers, both in batch and, where available, in continuous process configurations, spray dryers, and extruders.

Process of Using

The present disclosure further relates to methods of using a liquid fabric care composition. For example, the present disclosure relates to methods of treating a fabric with a composition according to the present disclosure. Such methods may provide cleaning, conditioning, and/or freshening benefits.

The method may include a step of contacting a fabric with a liquid fabric care composition of the present disclosure. The composition may be in neat form or diluted in a liquor, for example, a wash or rinse liquor. The composition may be diluted in water prior, during, or after contacting the surface or article. The fabric may be optionally washed and/or rinsed before and/or after the contacting step. The composition may be applied directly onto a fabric or provided to a dispensing vessel or drum of an automatic laundry machine.

The method of treating a fabric may include the steps of: (a) optionally washing, rinsing and/or drying the fabric; (b) contacting the fabric with a composition as described herein, optionally in the presence of water; (c) optionally washing and/or rinsing the fabric; and (d) optionally drying, whether passively and/or via an active method such as a laundry dryer. The method may occur during the wash cycle or the rinse cycle, preferably the rinse cycle, of an automatic washing machine.

For purposes of the present invention, treatment may include but is not limited to, scrubbing and/or mechanical agitation. The fabric may comprise most any fabric capable of being laundered or treated in normal consumer use conditions.

Liquors that comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C. and, the water to fabric ratio may be typically from about 1:1 to about 30:1.

Use of Capsules

It has been found that capsules according to the present disclosure can be used to provide various benefits to a target fabric, for example when formulated in a fabric care composition and being used to treat a fabric. The present disclosure may relate to the use of capsules to provide freshness benefits, softness benefits, or a combination thereof to a fabric when the fabric is treated with a fabric care composition that includes the capsules.

For example, the present disclosure relates to the use of capsules according to the present disclosure to provide freshness benefits to a fabric when the fabric is treated with a fabric care composition that includes such capsules. As used herein, "freshness benefits" means benefits related to desirable fragrances provided to a target fabric, compared to comparative fabrics treated by the same fabric care composition in the absence of such capsules, and/or when comparative fabrics are treated with the same fabric care composition comprising comparative capsules. The freshness benefits may be assessed by any technique described herein, such as via olfactive panels and/or headspace analysis.

The present disclosure also relates to the use of capsules according to the present disclosure to provide softness benefits to a fabric when the fabric is treated with a fabric care composition that includes such capsules. As used herein, "softness benefits" means benefits provided to a target fabric related to an increase in softness, lubrication, friction reduction, or other hand-feel benefits, compared to comparative fabrics treated by the same fabric care composition in the absence of such capsules, and/or when comparative fabrics are treated with the same fabric care composition comprising comparative capsules. The softness benefits may be assessed by any suitable technique.

The present disclosure also relates to the use of capsules according to the present disclosure to provide both freshness benefits and softness benefits to a fabric when the fabric is treated with a fabric care composition that includes such capsules. It is typically advantageous to have two benefits, such as freshness and feel benefits, being provided by a single ingredient, as this can lead to cost savings, reduction of manufacturing complexity, and formulation efficiencies.

Such ingredients may be particularly useful in products where one or both benefits are typically expected by the consumer, such as in a liquid laundry detergent, a fabric enhancer, or a laundry additive in the form of a bead or pastille.

The uses described herein relate to fabrics being "treated" with a fabric care composition. The treatment may preferably be in an automatic washing machine, preferably according to a conventional wash/rinse cycle. The fabric care composition may be in the form of a liquid or a solid, preferably a liquid, more preferably a liquid laundry detergent, a liquid fabric enhancer, or a liquid fabric refresher spray, most preferably a liquid fabric enhancer. The fabric care composition may be a liquid fabric care composition according to the present disclosure, which may include ingredients and levels as described herein, including the disclosure relating to the capsules.

COMBINATIONS

Specifically contemplated combinations of the disclosure are herein described in the following lettered paragraphs. These combinations are intended to be illustrative in nature and are not intended to be limiting.

A. A liquid fabric care composition comprising: a fabric treatment adjunct, wherein the fabric treatment adjunct is selected from the group consisting of a conditioning active, a surfactant, or a mixture thereof, wherein, if present, the conditioning active is selected from the group consisting of an alkyl quaternary ammonium compound ("alkyl quat"), an alkyl ester quaternary ammonium compound ("alkyl ester quat"), and mixtures thereof, and wherein, if present, the surfactant is selected from the group consisting of anionic surfactant, nonionic surfactant, cationic surfactant, zwitterionic surfactant, amphoteric surfactant, ampholytic surfactant, and mixtures thereof; and a population of capsules, the capsules comprising a core and a shell surrounding the core, wherein the core comprises perfume raw materials, wherein the shell comprises: a substantially inorganic first shell component comprising a condensed layer and a nanoparticle layer, wherein the condensed layer comprises a condensation product of a precursor, wherein the nanoparticle layer comprises inorganic nanoparticles, and wherein the condensed layer is disposed between the core and the nanoparticle layer; an inorganic second shell component surrounding the first shell component, wherein the second shell component surrounds the nanoparticle layer; wherein the precursor comprises at least one compound selected from the group consisting of Formula (I), Formula (II), and a mixture thereof, wherein Formula (I) is $(M^vO_zY_n)_w$, wherein Formula (II) is $(M^vO_zY_nR^1{}_p)_w$, wherein for Formula (I), Formula (II), or the mixture thereof: each M is independently selected from the group consisting of silicon, titanium, and aluminum, v is the valence number of M and is 3 or 4, z is from 0.5 to 1.6, each Y is independently selected from —OH, —$OR_2$, halogen,

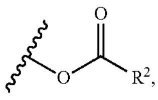

,

—$NH_2$, —$NHR^2$, —$N(R^2)_2$, and

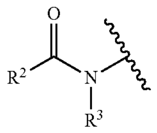

, wherein $R^2$ is a $C_1$ to $C_{20}$ alkyl, $C_1$ to $C_{20}$ alkylene, $C_6$ to $C_{22}$ aryl, or a 5-12 membered heteroaryl, wherein the heteroaryl comprises from 1 to 3 ring heteroatoms selected from O, N, and S, wherein $R^3$ is a H, $C_1$ to $C_{20}$ alkyl, $C_1$ to $C_{20}$ alkylene, $C_6$ to $C_{22}$ aryl, or a 5-12 membered heteroaryl, wherein the heteroaryl comprises from 1 to 3 ring heteroatoms selected from O, N, and S, w is from 2 to 2000; wherein for Formula (I), n is from 0.7 to (v-1); and wherein for Formula (II), n is from 0 to (v-1); each $R^1$ is independently selected from the group consisting of: a $C_1$ to $C_{30}$ alkyl; a $C_1$ to $C_{30}$ alkylene; a $C_1$ to $C_{30}$ alkyl substituted with a member selected from the group consisting of a halogen, —$OCF_3$, —$NO_2$, —CN, —NC, —OH, —OCN, —NCO, alkoxy, epoxy, amino, mercapto, acryloyl, —$CO_2H$, —C(O)-alkyl, —C(O)O-aryl, and —C(O)O -heteroaryl; and a $C_1$ to $C_{30}$ alkylene substituted with a member selected from the group consisting of a halogen, —$OCF_3$, —$NO_2$, —CN, —NC, —OH, —OCN, —NCO, alkoxy, epoxy, amino, mercapto, acryloyl, —C(O)OH, —C(O)O-alkyl, —C(O)O-aryl, and —C(O)O-heteroaryl; and p is a number that is greater than zero and is up to pmax, wherein pmax=60/[9*Mw($R^1$)+8], wherein Mw($R^1$) is the molecular weight of the $R^1$ group.

B. A liquid fabric care composition comprising: from about 5% to about 99.5%, by weight of the composition, of water; and a population of capsules, the capsules comprising a core and a shell surrounding the core, wherein the core comprises perfume raw materials, and wherein the shell is as is describe in paragraph A.

C. The liquid fabric care composition according to any of paragraphs A or B, wherein the precursor comprises at least one compound according to Formula (I), preferably wherein the precursor is free of compounds according to Formula (II).

D. The liquid fabric care composition according to any of paragraphs A-C, wherein the precursor comprises at least one compound according to Formula (II).

E. The liquid fabric care composition according to any of paragraphs A-D, wherein the population of capsules is characterized by one or more of the following: (a) a mean volume weighted capsule diameter of from about 10 lam to about 200 lam, preferably about 10 lam to about 190 lam; (b) a mean shell thickness of from about 170 rim to about 1000 nm; (c) a volumetric core/shell ratio of from about 50:50 to 99:1, preferably 60:40 to 99:1, more preferably 70:30 to 98:2, even more preferably 80:20 to 96:4; (d) the first shell component comprises no more than about 5 wt %, preferably no more than about 2 wt %, more preferably about 0 wt %, of organic content, by weight of the first shell component; or (e) a mixture thereof.

F. The liquid fabric care composition according to any of paragraphs A-E, wherein the compounds of Formula (I), Formula (II), or both are characterized by one or more of the following: (a) a Polystyrene equivalent Weight Average Molecular Weight (Mw) of from about 700 Da to about 30,000Da; (b) a degree of branching of 0.2 to about 0.6; (c) a molecular weight polydispersity index of about 1 to about 20; or (d) a mixture thereof.

G. The liquid fabric care composition according to any of paragraphs A-F, wherein for Formula (I), Formula (II), or both, M is silicon.

H. The liquid fabric care composition according to to any of paragraphs A-G, wherein for Formula (I), Formula (II), or both, Y is OR, wherein R is selected from a methyl group, an ethyl group, a propyl group, or a butyl group, preferably an ethyl group.

I. The liquid fabric care composition according to any of paragraphs A-H, wherein the second shell component comprises a material selected from the group consisting of calcium carbonate, silica, and a combination thereof.

J. The liquid fabric care composition according to any of paragraphs A-I, wherein the inorganic nanoparticles of the first shell component comprise at least one of metal nanoparticles, mineral nanoparticles, metal-oxide nanoparticles or semi-metal oxide nanoparticles, preferably wherein the inorganic nanoparticles comprise one or more materials selected from the group consisting of $SiO_2$, $TiO_2$, $Al_2O_3$, $Fe_2O_3$, $Fe_3O_4$, $CaCO_3$, clay, silver, gold, or copper, more preferably wherein the inorganic nanoparticles comprise one or more materials selected from the group consisting of $SiO_2$, $CaCO_3$, $Al_2O_3$ and clay.

K. The liquid fabric care composition according to any of paragraphs A-J, wherein the inorganic second shell component comprises at least one of $SiO_2$, $TiO_2$, $Al_2O_3$, $CaCO_3$, $Ca_2SiO_4$, $Fe_2O_3$, $Fe_3O_4$, iron, silver, nickel, gold, copper, or clay, preferably at least one of $SiO_2$ or $CaCO_3$, more preferably $SiO_2$.

L. The liquid fabric care composition according to any of paragraphs A-K, wherein the liquid fabric care composition comprises from about 5% to about 99.5%, by weight of the composition, of water, preferably from about 50% to about 99.5%, more preferably from about 60% to about 95%, even more preferably from about 75% to about 90%, by weight of the composition, of water.

M. The liquid fabric care composition according to any of paragraphs A-L, wherein the liquid fabric care composition is characterized by a viscosity of from 1 to 1500 centipoises (1-1500 mPa*s), from 100 to 1000 centipoises (100-1000 mPa*s), or from 200 to 500 centipoises (200-500 mPa*s) at 20 $s^{-1}$ and 21° C.

N. The liquid fabric care composition according to any of paragraphs A-M, wherein the fabric treatment adjunct comprises the conditioning active, preferably wherein the conditioning active is present at a level of from about 1% to about 35%, by weight of the composition.

O. The liquid fabric care composition according to any of paragraphs A-N, wherein the fabric treatment adjunct comprises the conditioning active, and wherein the conditioning active comprises an alkyl ester quat, preferably selected from the group consisting of monoester alkyl quats, diester alkyl quats, triester alkyl quats, and mixtures thereof.

P. The liquid fabric care composition according to any of paragraphs A-O, wherein the fabric treatment adjunct comprises surfactant, preferably wherein the surfactant is present at a level of from about 1% to about 50%, more preferably from about 5% to about 45%, even more preferably from about 10% to about 40%, by weight of the composition.

Q. The liquid fabric care composition according to any of paragraphs A-P, wherein the fabric treatment adjunct comprises surfactant, wherein the surfactant is selected from the group consisting of anionic surfactant, nonionic surfactant, zwitterionic surfactant, and mixtures thereof.

R. The liquid fabric care composition according to any of paragraphs A-Q, wherein the liquid fabric care composition further comprises a material selected from silicones, non-ester quaternary ammonium compounds, amines, fatty esters, sucrose esters, silicones, dispersible polyolefins, polysaccharides, fatty acids, softening or conditioning oils, polymer latexes, or combinations thereof, preferably silicone.

S. The liquid fabric care composition according to any of paragraphs A-R, wherein the population of encapsulates is present at a level of about 0.1% to about 10%, by weight of the liquid fabric care composition.

T. The liquid fabric care composition according to any of paragraphs A-S, wherein the liquid fabric care composition further comprises a structurant.

U. The liquid fabric care composition according to any of paragraphs A-T, wherein the liquid fabric care composition is a liquid fabric enhancer.

V. The liquid fabric care composition according to any of paragraphs A-U, wherein the liquid fabric care composition is packaged in a sprayable bottle.

W. A process for treating a surface, preferably a fabric, wherein the process comprises the step of: contacting the surface with the liquid fabric care composition according to any of paragraphs A-V, optionally in the presence of water.

X. A process of making a liquid fabric care composition comprising: providing a liquid base composition comprising a member selected from the group consisting of a fabric treatment adjunct, water, and mixtures thereof, wherein the fabric treatment adjunct is selected from the group consisting of a conditioning active, a surfactant, or a mixture thereof, wherein, if present, the conditioning active is selected from the group consisting of an alkyl quaternary ammonium compound ("alkyl quat"), an alkyl ester quaternary ammonium compound ("alkyl ester quat"), and mixtures thereof, and wherein, if present, the surfactant is selected from the group consisting of anionic surfactant, nonionic surfactant, cationic surfactant, zwitterionic surfactant, amphoteric surfactant, ampholytic surfactant, and mixtures thereof; and providing a population of capsules to the base composition, wherein the capsules and/or liquid care composition are as described in any of paragraphs A-V.

Y. The use of capsules to provide freshness benefits, softness benefits, or a combination thereof to a fabric when the fabric is treated with a fabric care composition that includes the capsules, wherein the capsules are as described in any of paragraphs A-V.

TEST METHODS

It is understood that the test methods that are disclosed in the Test Methods Section of the present application should be used to determine the respective values of the parameters of Applicant's claimed subject matter as claimed and described herein.

Method to Determine logP

The value of the log of the Octanol/Water Partition Coefficient (logP) is computed for each PRM in the perfume mixture being tested. The logP of an individual PRM is calculated using the Consensus logP Computational Model, version 14.02 (Linux) available from Advanced Chemistry Development Inc. (ACD/Labs) (Toronto, Canada) to provide the unitless logP value. The ACD/Labs' Consensus logP Computational Model is part of the ACD/Labs model suite.

Viscosity Method

The viscosity of neat product is determined using a Brookfield® DV-E rotational viscometer, spindle 2, at 60 rpm, at about 20-21° C.

Mean Shell Thickness Measurement

The capsule shell, including the first shell component and the second shell component, when present, is measured in nanometers on twenty benefit agent containing delivery capsules making use of a Focused Ion Beam Scanning Electron Microscope (FIB-SEM; FEI Helios Nanolab 650) or equivalent. Samples are prepared by diluting a small volume of the liquid capsule dispersion (20 μl) with distilled water (1:10). The suspension is then deposited on an ethanol cleaned aluminium stub and transferred to a carbon coater (Leica EM ACE600 or equivalent). Samples are left to dry under vacuum in the coater (vacuum level: $10^{-5}$ mbar). Next 25-50 nm of carbon is flash deposited onto the sample to deposit a conductive carbon layer onto the surface. The aluminium stubs are then transferred to the FIB-SEM to prepare cross-sections of the capsules. Cross-sections are prepared by ion milling with 2.5 nA emission current at 30 kV accelerating voltage using the cross-section cleaning pattern. Images are acquired at 5.0 kV and 100 pA in immersion mode (dwell time approx. 10 μs) with a magnification of approx. 10,000.

Images are acquired of the fractured shell in cross-sectional view from 20 benefit delivery capsules selected in a random manner which is unbiased by their size, to create a representative sample of the distribution of capsules sizes present. The shell thickness of each of the 20 capsules is measured using the calibrated microscope software at 3 different random locations, by drawing a measurement line perpendicular to the tangent of the outer surface of the capsule shell. The 60 independent thickness measurements are recorded and used to calculate the mean thickness.

Mean and Coefficient of Variation of Volume-Weighted Capsule Diameter

Capsule size distribution is determined via single-particle optical sensing (SPOS), also called optical particle counting (OPC), using the AccuSizer 780 AD instrument or equivalent and the accompanying software CW788 version 1.82 (Particle Sizing Systems, Santa Barbara, California, U.S.A.), or equivalent. The instrument is configured with the following conditions and selections: Flow Rate=1 mL/sec; Lower Size Threshold=0.50 μm; Sensor Model Number=LE400-05SE or equivalent; Auto-dilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery capsules in suspension is introduced, and its density of capsules adjusted with DI water as necessary via autodilution to result in capsule counts of at most 9200 per mL. During a time period of 60 seconds the suspension is analyzed. The range of size used was from 1 μm to 493.3 μm.

Volume Distribution:

$$CoVv(\%) = \frac{\sigma_v}{\mu_v} * 100$$

-continued $$\sigma v = \sum_{i=1\ um}^{493.3\ um} \left(x_{i,v} * (d_i - \mu_v)^2\right)0.5$$

$$\mu_v = \frac{\sum_{i=1\ um}^{493.3\ um} (x_{i,v} * d_i)}{\sum_{i=1\ um}^{493.3\ um} x_{i,v}}$$

where:

$CoV_v$—Coefficient of variation of the volume weighted size distribution $\sigma_v$—Standard deviation of volume-weighted size distribution $\mu_v$—mean of volume-weighted size distribution $d_i$—diameter in fraction i $x_{i,v}$—frequency in fraction i (corresponding to diameter i) of volume-weighted size distribution $$x_{i,v} = \frac{x_{i,n} * d_i^3}{\sum_{i=1\ um}^{493.3\ um} (x_{i,n} * d_i^3)}$$

Volumetric Core-Shell Ratio Evaluation

The volumetric core-shell ratio values are determined as follows, which relies upon the mean shell thickness as measured by the Shell Thickness Test Method. The volumetric core-shell ratio of capsules where their mean shell thickness was measured is calculated by the following equation:

$$\frac{\text{Core}}{\text{Shell}} = \frac{\left(1 - \frac{2 * \text{Thickness}}{D_{caps}}\right)^3}{\left(1 - \left(1 - \frac{2 * \text{Thickness}}{D_{caps}}\right)^3\right)}$$

wherein Thickness is the mean shell thickness of a population of capsules measured by FIBSEM and the $D_{caps}$ is the mean volume weighted diameter of the population of capsules measured by optical particle counting.

This ratio can be translated to fractional core-shell ratio values by calculating the core weight percentage using the following equation:

$$\%\ \text{Core} = \left(\frac{\frac{\text{Core}}{\text{Shell}}}{1 + \frac{\text{Core}}{\text{Shell}}}\right) * 100$$

% Shell=100−% Core and shell percentage can be calculated based on the following equation:.

% Shell=100−% Core

Degree of Branching Method

The degree of branching of the precursors was determined as follows: Degree of branching is measured using (29Si) Nuclear Magnetic Resonance Spectroscopy (NMR).

Sample Preparation

Each sample is diluted to a 25% solution using deuterated benzene (Benzene-D6 "100%" (D, 99.96% available from Cambridge Isotope Laboratories Inc., Tewksbury, MA, or equivalent). 0.015M Chromium(III) acetylacetonate (99.99% purity, available from Sigma-Aldrich, St. Louis, MO, or equivalent) is added as a paramagnetic relaxation reagent. If glass NMR tubes (Wilmed-LabGlass, Vineland, NJ or equivalent) are used for analysis, a blank sample must also be prepared by filling an NMR tube with the same type of deuterated solvent used to dissolve the samples. The same glass tube must be used to analyze the blank and the sample.

Sample Analysis

The degree of branching is determined using a Bruker 400 MHz Nuclear Magnetic Resonance Spectroscopy (NMR) instrument, or equivalent. A standard silicon (29Si) method (e.g. from Bruker) is used with default parameter settings with a minimum of 1000 scans and a relaxation time of 30 seconds.

Sample Processing

The samples are stored and processed using system software appropriate for NMR spectroscopy such as MestReNova version 12.0.4-22023 (available from Mestrelab Research) or equivalent. Phase adjusting and background correction are applied. There is a large, broad, signal present that stretches from −70 to −136 ppm which is the result of using glass NMR tubes as well as glass present in the probe housing. This signal is suppressed by subtracting the spectra of the blank sample from the spectra of the synthesized sample provided that the same tube and the same method parameters are used to analyze the blank and the sample. To further account for any slight differences in data collection, tubes, etc., an area outside of the peaks of interest area should be integrated and normalized to a consistent value. For example, integrate −117 to −115 ppm and set the integration value to 4 for all blanks and samples.

The resulting spectra produces a maximum of five main peak areas. The first peak (QO) corresponds to unreacted TAOS. The second set of peaks (Q1) corresponds to end groups. The next set of peaks (Q2) correspond to linear groups. The next set of broad peaks (Q3) are semi-dendritic units. The last set of broad peaks (Q4) are dendritic units. When PAOS and PBOS are analyzed, each group falls within a defined ppm range. Representative ranges are described in the following table:

| Group ID | # of Bridging Oxygen per Silicon | ppm Range |
|---|---|---|
| Q0 | 0 | −80 to −84 |
| Q1 | 1 | −88 to −91 |
| Q2 | 2 | −93 to −98 |
| Q3 | 3 | −100 to −106 |
| Q4 | 4 | −108 to −115 |

Polymethoxysilane has a different chemical shift for Q0 and Q1, an overlapping signal for Q2, and an unchanged Q3 and Q4 as noted in the table below:

| Group ID | # of Bridging Oxygen per Silicon | ppm Range |
|---|---|---|
| Q0 | 0 | −78 to −80 |
| Q1 | 1 | −85 to −88 |
| Q2 | 2 | −91 to −96 |
| Q3 | 3 | −100 to −106 |
| Q4 | 4 | −108 to −115 |

The ppm ranges indicated in the tables above may not apply to all monomers. Other monomers may cause altered chemical shifts, however, proper assignment of Q0-Q4 should not be affected.

Using MestReNova, each group of peaks is integrated, and the degree of branching can be calculated by the following equation:

$$\text{Degree of Branching} = (1/4) * \frac{3 * Q3 + 4 * Q4}{Q1 + Q2 + Q3 + Q4}$$

Molecular Weight and Polydispersity Index Determination Method

The molecular weight (Polystyrene equivalent Weight Average Molecular Weight (Mw)) and polydispersity index (Mw/Mn) of the condensed layer precursors described herein are determined using Size Exclusion Chromatography with Refractive Index detection. Mn is the number average molecular weight.

Sample Preparation

Samples are weighed and then diluted with the solvent used in the instrument system to a targeted concentration of 10 mg/mL. For example, weigh 50 mg of polyalkoxysilane into a 5 mL volumetric flask, dissolve and dilute to volume with toluene. After the sample has dissolved in the solvent, it is passed through a 0.45 um nylon filter and loaded into the instrument autosampler.

Sample Analysis

An HPLC system with autosampler (e.g. Waters 2695 HPLC Separation Module, Waters Corporation, Milford MA, or equivalent) connected to a refractive index detector (e.g. Wyatt 2414 refractive index detector, Santa Barbara, CA, or equivalent) is used for polymer analysis. Separation is performed on three columns, each 7.8 mm I.D.×300 mm in length, packed with 5 μm polystyrene-divinylbenzene media, connected in series, which have molecular weight cutoffs of 1, 10, and 60 kDA, respectively. Suitable columns are the TSKGel G1000HHR, G2000HHR, and G3000HHR columns (available from TOSOH Bioscience, King of Prussia, PA) or equivalent. A 6 mm I.D.×40 mm long 5 μm polystyrene-divinylbenzene guard column (e.g. TSKgel Guardcolumn HHR-L, TOSOH Bioscience, or equivalent) is used to protect the analytical columns. Toluene (HPLC grade or equivalent) is pumped isocratically at 1.0 mL/min, with both the column and detector maintained at 25° C. 100 μL of the prepared sample is injected for analysis. The sample data is stored and processed using software with GPC calculation capability (e.g. ASTRA Version 6.1.7.17 software, available from Wyatt Technologies, Santa Barbara, CA or equivalent.)

The system is calibrated using ten or more narrowly dispersed polystyrene standards (e.g. Standard ReadyCal Set, (e.g. Sigma Aldrich, PN 76552, or equivalent) that have known molecular weights, ranging from about 0.250-70 kDa and using a third order fit for the Mp verses Retention Time Curve.

Using the system software, calculate and report Weight Average Molecular Weight (Mw) and PolyDispersity Index (Mw/Mn).

Method of Calculating Organic Content in First Shell Component

As used herein, the definition of organic moiety in the inorganic shell of the capsules according to the present disclosure is: any moiety X that cannot be cleaved from a metal precursor bearing a metal M (where M belongs to the group of metals and semi-metals, and X belongs to the group of non-metals) via hydrolysis of the M-X bond linking said moiety to the inorganic precursor of metal or semi-metal M and under specific reaction conditions, will be considered as organic. A minimal degree of hydrolysis of 1% when exposed to neutral pH distilled water for a duration of 24 h without stirring, is set as the reaction conditions.

This method allows one to calculate a theoretical organic content assuming full conversion of all hydrolysable groups. As such, it allows one to assess a theoretical percentage of organic for any mixture of silanes and the result is only indicative of this precursor mixture itself, not the actual organic content in the first shell component. Therefore, when a certain percentage of organic content for the first shell component is disclosed anywhere in this document, it is to be understood as containing any mixture of unhydrolyzed or pre-polymerized precursors that according to the below calculations give a theoretical organic content below the disclosed number.

Example for Silane (but not Limited Thereto; See Generic Formula at the End of this Section)

Consider a mixture of silanes, with a molar fraction Y, for each, and where i is an ID number for each silane. Said mixture can be represented as follows:

$$Si(XR)_{4-n}R_n$$

where XR is a hydrolysable group under conditions mentioned in the definition above, $R^i_{ni}$ is non-hydrolyzable under conditions mentioned above and $n_i$=0, 1, 2 or 3.

Such a mixture of silanes will lead to a shell with the following general formula:

$$SiO_{\frac{(4-n)}{2}}R_n$$

Then, the weight percentage of organic moieties as defined earlier can be calculated as follows:

1) Find out Molar fraction of each precursor (nanoparticles included)
2) Determine general formula for each precursor (nanoparticles included)
3) Calculate general formula of precursor and nanoparticle mixture based on molar fractions
4) Transform into reacted silane (all hydrolysable groups to oxygen groups)
5) Calculate weight ratio of organic moieties vs. total mass (assuming 1 mole of Si for framework)

Example

| Raw material | Formula | Mw (g/mol) | weight (g) | amount (mmol) | Molar fraction |
|---|---|---|---|---|---|
| Sample AY | $SiO(OEt)_2$ | 134 | 1 | 7.46 | 0.57 |
| TEOS | $Si(OEt)_4$ | 208 | 0.2 | 0.96 | 0.07 |
| DEDMS | $Si(OEt)_2Me_2$ | 148.27 | 0.2 | 1.35 | 0.10 |
| SiO2 NP | $SiO_2$ | 60 | 0.2 | 3.33 | 0.25 |

To calculate the general formula for the mixture, each atoms index in the individual formulas is to be multiplied by their respective molar fractions. Then, for the mixture, a sum of the fractionated indexes is to be taken when similar ones occur (typically for ethoxy groups).

Note: Sum of all Si fractions will always add to 1 in the mixture general formula, by virtue of the calculation method (sum of all molar fractions for Si yields 1).

$$SiO_{1*0.57+2*0.25}(OEt)_{2*0.57+4*0.07+2*0.10}Me_{2*0.10}$$

$$SiO_{1.07}(OEt)_{1.62}Me_{0.20}$$

To transform the unreacted formula to a reacted one, simply divide the index of ALL hydrolysable groups by 2, and then add them together (with any pre-existing oxygen groups if applicable) to obtain the fully reacted silane.

$$SiO_{1.88}Me_{0.20}$$

In this case, the expected result is $SiO_{1.9}Me_{0.2}$, as the sum of all indexes must follow the following formula:

$$A+B/2=2,$$

where A is the oxygen atom index and B is the sum of all non-hydrolysable indexes. The small error occurs from rounding up during calculations and should be corrected. The index on the oxygen atom is then readjusted to satisfy this formula.

Therefore, the final formula is $SiO_{1.9}Me_{0.2}$, and the weight ratio of organic is calculated below:

$$\text{Weight ratio}=(0.20*15)/(28+1.9*16+0.20*15)=4.9\%$$

General Case:

The above formulas can be generalized by considering the valency of the metal or semi-metal M, thus giving the following modified formulas:

$$M(XR)_{V-ni}R^i_{ni}$$

and using a similar method but considering the valency V for the respective metal.

Method of Measuring Iodine Value of a Quaternary Ammonium Ester Compound

The iodine value of a quaternary ammonium ester fabric compound is the iodine value of the parent fatty acid from which the fabric conditioning active is formed, and is defined as the number of grams of iodine which react with 100 grams of parent fatty acid from which the fabric conditioning active is formed.

First, the quaternary ammonium ester compound is hydrolysed according to the following protocol: 25 g of fabric treatment composition is mixed with 50 mL of water and 0.3 mL of sodium hydroxide (50% activity). This mixture is boiled for at least an hour on a hotplate while avoiding that the mixture dries out. After an hour, the mixture is allowed to cool down and the pH is adjusted to neutral (pH between 6 and 8) with sulfuric acid 25% using pH strips or a calibrated pH electrode.

Next the fatty acid is extracted from the mixture via acidified liquid-liquid extraction with hexane or petroleum ether: the sample mixture is diluted with water/ethanol (1:1) to 160 mL in an extraction cylinder, 5 grams of sodium chloride, 0.3 mL of sulfuric acid (25% activity) and 50 mL of hexane are added. The cylinder is stoppered and shaken for at least 1 minute. Next, the cylinder is left to rest until 2 layers are formed. The top layer containing the fatty acid in hexane is transferred to another recipient. The hexane is then evaporated using a hotplate leaving behind the extracted fatty acid.

Next, the iodine value of the parent fatty acid from which the fabric conditioning active is formed is determined following ISO3961:2013. The method for calculating the iodine value of a parent fatty acid comprises dissolving a prescribed amount (from 0.1-3 g) into 15 mL of chloroform. The dissolved parent fatty acid is then reacted with 25 mL of iodine monochloride in acetic acid solution (0.1M). To this, 20 mL of 10% potassium iodide solution and 150 mL deionised water is added. After the addition of the halogen has taken place, the excess of iodine monochloride is determined by titration with sodium thiosulphate solution (0.1M) in the presence of a blue starch indicator powder. At the same time a blank is determined with the same quantity of reagents and under the same conditions. The difference between the volume of sodium thiosulphate used in the blank and that used in the reaction with the parent fatty acid enables the iodine value to be calculated.

Leakage Method

The testing of capsule leakage in liquid compositions (e.g., liquid fabric enhancer/"LFE" compositions and/or heavy-duty liquid/"HDL" detergents) is performed as follows.

Homogenized slurry (of a known perfume activity, defined as the weight fraction of the perfume in the total slurry) is added and adequately dispersed to a known amount of LFE base or HDL base, such that the perfume weight fraction in the final formulation is of 0.25 w % (or between 0.2 w % and 0.3 w %).

The formulated product is stored in a jar or glass container covered with an airtight lid and where the volume of headspace above the liquid is no more than 5× the volume of the liquid itself, for 7 days at 35 C and 40% relative humidity.

Sample Preparation

After the 7 days of storage, samples of capsules, total oil, and free oil are prepared as follows:

(a) Preparation of capsule sample: Between 0.1 g and 0.11 g of the formulation containing slurry is introduced into the bottom of a GC vial (see below for specific of the GC vials and method) and where the GC vials are capped with a crimp cap to yield an airtight milieu, thus obtaining the capsule sample. This step is performed twice to obtain two readings, and the mean of the two values will be used, provided they do not differ too much from each other, in which case the analysis needs to be repeated. The GC vials are then analyzed via GC/MS, as detailed below.

(b) Preparation of total oil sample: A 1 gram aliquot of the formulation is introduced into a 7 ml cylindrical shape vial of a diameter of 1 cm to 1.5 cm, equipped with a magnetic stirring bar of length no less than the radius of the 7 ml vial, thus ensuring proper mixing in the vial. The 1 gram aliquot in the 7 ml vial is then mixed on a stirring plate for 24 h at 500 rpm, thereby ensuring that the capsules are broken by the grinding action of the stir bar against the bottom of the 7 ml vial. Optical microscopy can be used to verify that no more intact capsules remain. In case such capsules are found, the step is to repeated for an additional 24 h, or until all or almost all capsules are broken. Then, the formulation containing broken capsules is introduced into GC vials in a similar manner as for step (a). This yields total oil samples. It is to be noted that the capsule sample and the total oil sample are not analyzed on the same day, as there is a need to prepare the total oil sample after the leakage sample has been removed from storage. It is to be noted that the capsule sample and the total oil sample are not analyzed on the same day, as there is a need to prepare the total oil sample after the capsule sample has been removed from storage. This does not affect (or does not substantially affect) the results.

(c) Preparation of free oil sample: A LFE or HDL formulation containing between 0.2 w % and 0.3 w % (preferably 0.25 w %) of free oil is prepared, by adding and adequately dispersing a known amount of a perfume oil composition into a known amount of LFE or HDL. The perfume oil composition formulated herein is representative of the perfume oil composition that is present in the slurry. Then the free oil formulation is introduced into GC vials in a similar manner as for step (a). This yields reference samples, which must be used when analyzing both the capsule sample and the total oil sample.

On each day of analysis, the capsule samples or total oil samples must be run in conjunction with the reference sample.

GC/MS Method

For each sample, test and reference, aliquots of 0.1 gr to 0.11 gr of sample are transferred to 20 ml headspace vials (Gerstel SPME vial 20 ml, part no. 093640-035-00) and immediately sealed (sealed with Gerstel Crimp caps for SPME, part no. 093640-050-00). Two headspace vials are prepared for each sample. The sealed headspace vials are then allowed to equilibrate. Samples reach equilibrium after 3 hours at room temperature, but can be left to sit longer without detriment or change to the results, up until 24 hours after sealing the headspace vial. After equilibrating, the samples are analyzed by GC/MS.

GS/MS analysis are performed by sampling the headspace of each vial via SPME (50/30 μm DVB/Carboxen/PDMS, Sigma-Aldrich part #57329-U), with a vial penetration of 25 millimeters and an extraction time of 1 minute at room temperature. The SPME fiber is subsequently on-line thermally desorbed into the GC injector (270° C., splitless mode, 0.75 mm SPME Inlet liner (Restek, art #23434) or equivalent, 300 seconds desorption time and injector penetration of 43 millimeters). The perfume composition is analyzed by fast GC/MS in full scan mode. Ion extraction of the specific mass for each component is obtained.

Leakage Calculations

The leakage is calculated as follows, separately for the capsule sample and total oil sample, where "Area" denotes the area under the chromatogram peak corresponding to the PRM of interest:

For each PRM, the following formula gives a PRM leakage:

$$PRM \text{ leakage} = \frac{\text{Area}_{PRM\ Capsule\ (or\ total\ oil)sample}}{\text{Area}_{PRM\ reference\ sample}}$$

Once calculated for all PRMs for both the total oil sample and the capsule sample, the corrected PRM leakage can be calculated using the following formula:

$$\text{Corrected } PRM \text{ leakage} = \frac{PRM \text{ leakage}_{capsule\ sample}}{PRM \text{ leakage}_{total\ oil\ sample}}$$

Once the corrected PRM leakage has been calculated for all PRMs, the Average leakage can be found by taking the arithmetic mean of each corrected PRM leakage.

EXAMPLES

The examples provided below are intended to be illustrative in nature and are not intended to be limiting.

Example 1. Non-hydrolytic Precursor Synthesis

Sample A.

1000 g of tetraethoxysilane (TEOS, available from Sigma Aldrich) is added to a clean dry round bottom flask equipped with a stir bar and distillation apparatus under nitrogen atmosphere. 490 ml of acetic anhydride (available from Sigma Aldrich) and 5.8 g of Tetrakis(trimethylsiloxy)titanium (available from Gelest) is added and the contents of the flask are stirred for 28 hours at 135° C. During this time, the ethyl acetate generated by reaction of the ethoxy silane groups with acetic anhydride is distilled off. The reaction flask is cooled to room temperature and is placed on a rotary evaporator (Buchi Rotovapor R110), used in conjunction with a water bath and vacuum pump (Welch 1402 DuoSeal) to remove any remaining solvent and volatile compounds. The polyethoxysilane (PEOS) generated is a yellow viscous liquid with the following specifications found in Table 1. The ratio of TEOS to acetic anhydride can be varied to control the parameters presented in Table 1.

TABLE 1

| Parameters of PEOS | Results |
|---|---|
| Degree of branching (DB) | 0.26 |
| Molecular weight (Mw) | 1.2 kDa |
| Polydispersity index (PDI) | 3.9 |

Sample B.

1000 gr of TEOS (available from Sigma Aldrich) was added to a clean dry round bottom flask equipped with a stir bar and distillation apparatus under nitrogen atmosphere. Next, 564 gr of acetic anhydride (available from Sigma Aldrich) and 5.9 gr of Tetrakis(trimethylsiloxide) titanium (available from Gelest, Sigma Aldrich) were added and the contents of the flask and heated to 135 C under stirring. The reaction temperature was maintained at 135 C under vigorous stirring for 30 hours, during which the organic ester generated by reaction of the alkoxy silane groups with acetic anhydride was distilled off along with additional organic esters generated by the condensation of silyl-acetate groups with other alkoxysilane groups which occurred as the polyethoxysilane (PEOS) was generated. The reaction flask was cooled to room temperature and placed on a rotary evaporator (Buchi Rotovapor R110), used in conjunction with a water bath and vacuum pump (Welch 1402 DuoSeal) to remove any remaining solvent. The degree of branching (DB), Molecular weight (Mw) and polydispersity index (PDI) of the PEOS polymer synthetized were respectively 0.42, 2.99 and 2.70.

Example 2. Synthesis of Capsule Populations

Population A.

The oil phase is prepared by mixing and homogenizing (or even dissolving if all compounds are miscible) a precursor with a benefit agent and/or a core modifier (one part of precursor to four parts of benefit agent and/or core modifier). The water phase is prepared by adding 1.25 w % Aerosil 300 (available from Evonik) in a 0.1M HCl aqueous solution, dispersed with an ultrasound bath for at least 30 minutes.

Once each phase is prepared separately, they are combined (one part of oil phase to four parts of water), and the oil phase is dispersed into the water phase with IKA ultra-turrax S25N-10G mixing tool at 13400 RPM per 1 minute. Once the emulsification step is complete, the resulting emulsion is cured at different time and temperature combinations (see Table 2A; "RT"=room temperature, approx. 22° C.). In order to deposit a second shell component, the capsules receive a post-treatment with a second shell component solution: the slurry is pre-diluted in 0.1M HCl and treated with a controlled addition of a 10 wt % sodium silicate aqueous solution, using a suspended magnetic stirrer reactor at 350 RPM, at room temperature (details about pre-dilution and infusion rates and quantities of the sodium silicate solution are in table 2A; 25% dilution equals 4 times dilution). The pH is kept constant at pH 7 using 1M HCl (aq) and 1M NaOH(aq) solutions. The capsules are kept under agitation at 300 RPM for 24 hours, then are centrifuged for 10 minutes at 2500 rpm and re-dispersed in de-ionized water.

To test whether capsules collapse, the slurry must be diluted (by at least 10 times) into de-ionized water. Drops of the subsequent dilution are added onto a microscopy microslide and left to dry overnight at room temperature. The following day the dried capsules are observed under an optical microscope (without the use of a cover slide) by light transmission to assess if the capsules have retained their spherical shape.

TABLE 2A

| Capsule Sample ID | Core composition | Curing condition | Post-treatment condition |
|---|---|---|---|
| Sample A | Perfume 1 | 4 h at RT, 16 h at 50° C., and 96 h at 70° C. | Pre-dilution: 50% Infusion: 40 μl/min. and 0.16 ml/g of slurry |
| Sample B | Perfume 1 | 4 h at RT, 16 h at 50° C., and 96 h at 70° C. | Pre-dilution: 50% Infusion: 40 μl/min. and 0.16 ml/g of slurry |
| Sample C | Perfume 2 | 4 h at RT, 16 h at 50° C., and 96 h at 70° C. | Pre-dilution: 25% Infusion: 20 μl/min. and 0.4 ml/g of slurry |
| Sample D | Perfume 3 | 4 h at RT, 16 h at 50° C., and 96 h at 70° C. | Pre-dilution: 25% Infusion: 20 μl/min. and 0.4 ml/g of slurry |

TABLE 2A-continued

| Capsule Sample ID | Core composition | Curing condition | Post-treatment condition |
|---|---|---|---|
| Sample E | Perfume 4 | 4 h at RT, 16 h at 50° C., and 96 h at 70° C. | Pre-dilution: 25% Infusion: 20 μl/min. and 0.4 ml/g of slurry |
| Sample F | 40 wt % Perfume 1 and 60 wt % Isopropyl Myristate (IPM) | 3 weeks at 50° C. | Pre-dilution: 75% Infusion: 20 μl/min. and 0.13 ml/g of slurry |

FIG. 1 shows a schematic illustration of the method of making capsules 8 with a first shell component 6, prepared with a hydrophobic core 4. For example, in the first box 100, an oil phase 1 is provided to an aqueous phase 2. The oil phase 2 comprises a hydrophobic benefit agent, such as one or more perfume raw materials, as well as a liquid precursor material. Nanoparticles 3 have surrounded the oil phase 1, for example forming a Pickering emulsion. In the second box 101, a hydrolyzed precursor 5 begins to form at the interface around a core 4, where the core 4 comprises an oil phase that includes the benefit agent. In the third box 102, a first shell component 6 has formed around the core 4, where the first shell component is formed from the nanoparticles 3 and the hydrolyzed precursor 5.

Figure 3:
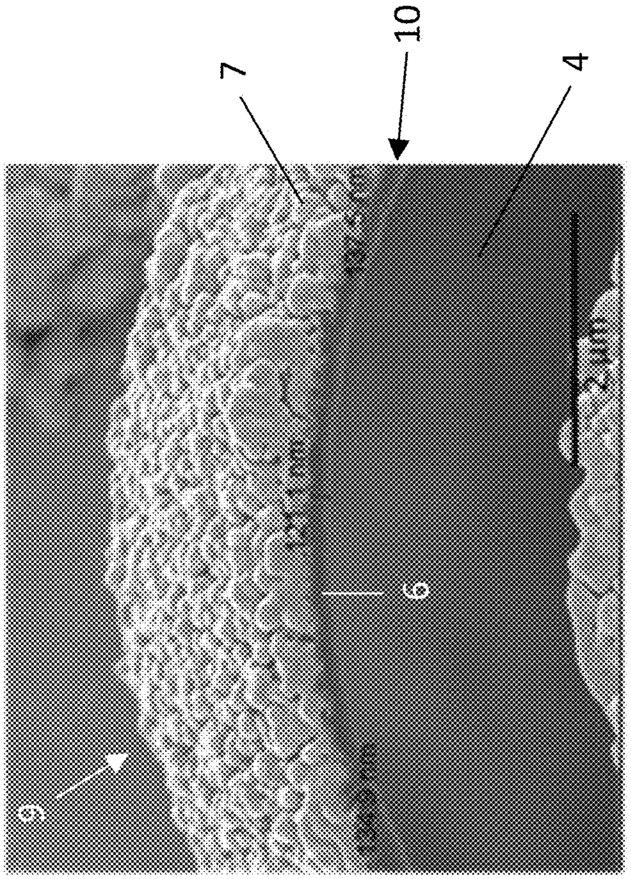
FIG. 3 is a scanning electron microscopy image of a capsule.
Figure 2:
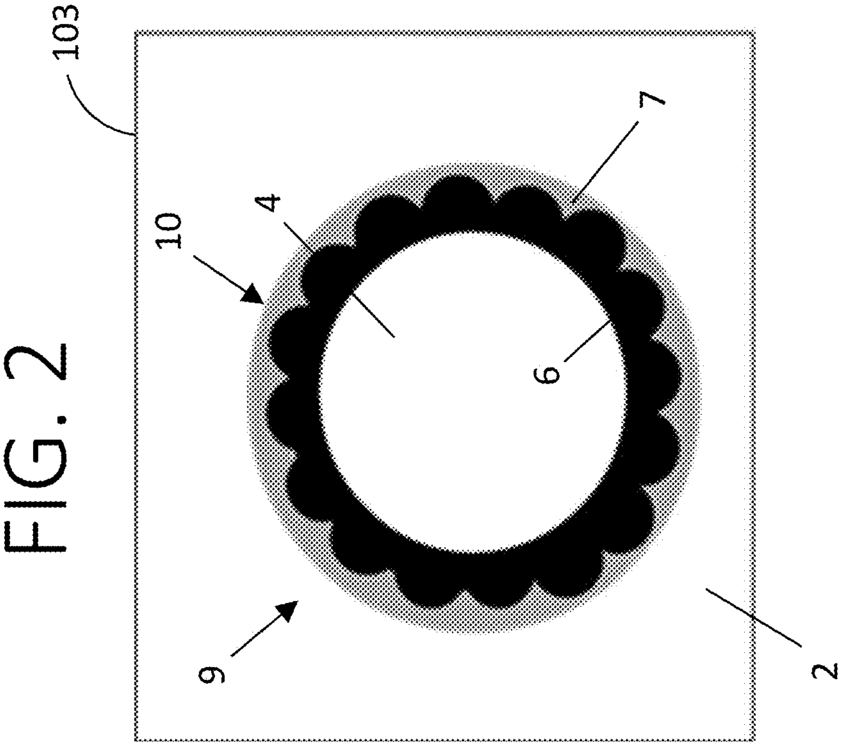
FIG. 2 shows a schematic illustration of a capsule with a first shell component and a second shell component.

FIG. 2 shows a schematic illustration in box 103 of a capsule 9 with a shell 10, the shell 10 having a first shell component 6 and a second shell component 7, around a core 4. The capsule 9 is shown in an aqueous phase 2. The core 4 comprises one or more perfume raw materials. FIG. 3 shows a scanning electron microscopy image of such a capsule 9 in cross-section. A core 4 is surrounded by shell 10, where the shell 10 includes a first shell component 6 surrounded by a second shell component 7.

Table 2B shows some parameters of the capsules of Sample A, Table 2A.

TABLE 2B

| Parameters | Sample A results |
|---|---|
| Mean Diameter (um) | 37.5 |
| CoV PSD (%) | 24.7 |
| Mean Shell Thickness (nm) | 371.2 |
| Thickness to Diameter ratio (%) | 1.0% |
| Effective core to shell ratio | 92:8 |
| Shell % organic | 0% |

Population B.

Five batches were made following the procedure below, and after the curing step, the 5 batches were combined to yield a combined slurry:

The oil phase was prepared by mixing and homogenizing (or even dissolving if all compounds are miscible) 3 g of the PEOS precursor synthesized above with 2 g of a benefit agent and/or a core modifier, here a fragrance oil. 100 gr of water phase was prepared by mixing 0.5 g of NaCl, 3.5 gr of Aerosil 300 fumed silica from Evonik and 96 gr of DI water. The fumed silica was dispersed in the aqueous phase with an IKA ultra-turrax (S25N) at 20000 RPM for 15 min.

Once each phase was prepared separately, 5 g of the oil phase was dispersed into 16 g of the water phase with an IKA Ultra-Turrax mixer (S25N-10 g) at 25000 RPM for 5 minutes to reach a desired mean oil droplet diameter. Then the pH was brought to 1 using HCl 0.1M added dropwise. Once the emulsification step was complete, the resulting emulsion was left resting without stirring for 4 hours at room temperature, and then 16 hours at 90° C. until enough curing had occurred for the capsules to not collapse. The five batches were combined after the curing step, to obtain a combined capsule slurry.

In order to deposit a second shell component, the combined capsule slurry received a post-treatment with a second shell component solution. 50 g of the combined slurry was diluted with 50 g of 0.1M HCl(aq). The pH was adjusted to 7 using 1M NaOH(aq) added dropwise. Then, the diluted slurry was treated with a controlled addition (40 μl per minute) of the second shell component precursor solution (20 ml of 15 w % of Sodium silicate(aq.)), using a suspended magnetic stirrer reactor at 300 RPM, at room temperature. The pH was kept constant at pH 7 by continuously infusing 1.6M HCl (aq) and 1M NaOH(aq) solutions. Then the capsules were centrifuged per 10 minutes at 2500 RPM. The supernatant was discarded, and the capsules were re-dispersed in de-ionized water.

To test whether capsules collapse, the slurry was diluted 10 times into de-ionized water. Drops of the subsequent dilution were added to a microscopy microslide and left to dry overnight at room temperature. The following day, the dried capsules were observed under an optical microscope by light transmission to assess if the capsules have retained their spherical shape (without the use of a cover slide). The capsules survived drying and didn't collapse. The mean volume weighted diameter of the capsules measured was 5.3 μm with a CoV of 46.2%. The percentage of organic content in the shell was 0%.

Example 3. Exemplary Liquid Fabric Care Composition Formulations

Exemplary formulations of a liquid fabric care composition, specifically liquid fabric enhancer ("LFE") compositions, are provided below in Table 3. Capsule-free "base" liquid fabric enhancers may be prepared according to the following compositions, but using no perfume capsules (i.e., 0 wt %).

TABLE 3

| | % Active (w/w) | | |
|---|---|---|---|
| Ingredient | Composition 1 | Composition 2 | Composition 3 |
| Quaternary ammonium ester material | 5% (Ester Quat 1)[1] | 7% (Ester Quat 2)[2] | 8% (Ester Quat 3)[3] |
| Perfume Capsules* (as % of perfume oil present) | 0.25% | 0.25% | 0.25% |
| Formic Acid | 0.045% | 0.045% | 0% |
| Hydrochloric acid | 0.01% | 0% | 0% |
| Preservative | 0.0045% | 0% | 0% |
| Chelant | 0.0071% | 0.0071% | 0% |
| Structurant | 0.10% | 0.30% | 0.1% |
| Antifoam | 0.008% | 0.00% | 0% |

[1]Ester Quat 1: Mixture of bis-(2-hydroxypropyl)-dimethylammonium methylsulfate fatty acid ester, (2-hydroxypropyl)-(1-methyl-2-hydroxyethyl)-dimethylammonium methylsulfate fatty acid ester, and bis-(1-methyl-2-hydroxyethyl)-dimethylammonium methylsulfate fatty acid ester, where the fatty acid esters are produced from a C12-C18 fatty acid mixture (REWOQUAT DIP V 20M Conc, ex Evonik)

[2]Ester Quat 2: N,N-bis(hydroxyethyl)-N,N-dimethyl ammonium chloride fatty acid ester, produced from C12-C18 fatty acid mixture (REWOQUAT CI-DEEDMAC, ex Evonik)

[3]Ester Quat 3: Esterification product of fatty acids (C16-18 and C18 unsaturated) with triethanolamine, quaternized with dimethyl sulphate (REWOQUAT WE 18, ex Evonik)

*Capsules according to any of Samples A-F in Table 2A above, or as described in subsequent examples Example 4. Comparison of Leakage of Different Types of Capsules in LFE Formulations This example compares leakage profiles of different types of capsules. A base liquid fabric enhancer ("LFE") having the formulation provided in Example 3, Table 3, Composition 1 is prepared.

Example 4-1: A population of perfume capsules is prepared encapsulating the mixture of perfume raw materials "Perfume 1" in accordance to Example 2, Sample A. The capsules of the population comprise a silica-based first shell component and a second shell component, according to the present disclosure.

Comparative Example 4-1: A population of perfume capsules comprising a polyacrylate shell, encapsulating the same mixture of perfume raw material ("Perfume 1"), according to encapsulates made according to the processes disclosed in US Publication No. 2011/0268802.

Figure 4:
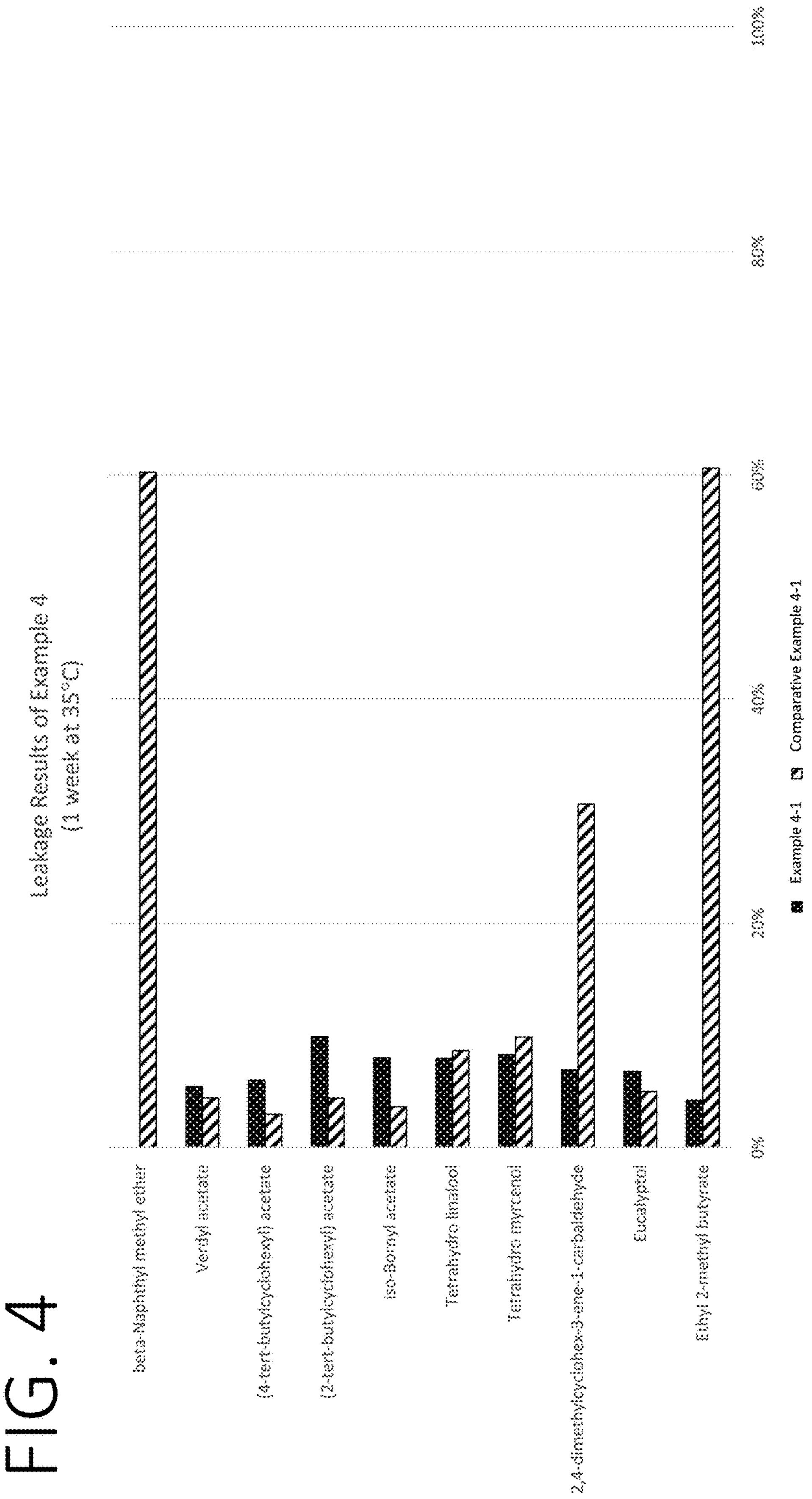
FIG. 4 is a graph of the leakage results of Example 4.

The two types of capsules are provided, respectively, to samples of the base liquid fabric softener composition so as to provide equal amounts of perfume (0.25 wt %, by weight of the compositions). The resulting products are stored for one week at 35° C. At the end of the storage period, samples of each product composition are analyzed for perfume leakage out of the capsule using headspace analysis. The data is reported as a percentage, determined by comparing the amount of the individual perfume raw materials found in the headspace to the amount originally provided to the capsules. The results are provided in Table 4. FIG. 4 shows a graph of the leakage results.

TABLE 4

| Perfume 1 | | | Leakage (as %) after 1 week at 35° C. | |
|---|---|---|---|---|
| Perfume Raw Material | CAS # | logP | Example 4-1 (silica shell) | Comparative Example 4-1 (polyacrylate shell) |
| Ethyl 2-methyl butyrate | 7452-79-1 | 2.16 | 4% | 61% |
| Eucalyptol | 470-82-6 | 2.74 | 7% | 5% |
| 2,4-dimethylcyclohex-3-ene-1-carbaldehyde | 68039-49-6 | 2.34 | 7% | 31% |
| Tetrahydro myrcenol | 18479-57-7 | 3.54 | 8% | 10% |
| Tetrahydro linalool | 78-69-3 | 3.48 | 8% | 9% |
| iso-Bornyl acetate | 125-12-2 | 3.60 | 8% | 4% |
| (2-tert-butylcyclohexyl) acetate | 88-41-5 | 4.23 | 10% | 4% |
| (4-tert-butylcyclohexyl) acetate | 32210-23-4 | 4.23 | 6% | 3% |
| Verdyl acetate | 5413-60-5 | 3.63 | 5% | 4% |
| beta-Naphthyl methyl ether | 93-04-9 | 3.47 | 0% | 60% |
| | | Average: | 6% | 19% |
| | | StdDev: | 3% | 23% |

As shown above in Table 4, capsules according to the present disclosure leak, on average, relatively less with regard to the PRMs tested, compared to capsules having polyacrylate walls.

Furthermore, the standard deviation of the leakage rates of capsules according to the present disclosure is relatively less compared to that of the polyacrylate capsules, indicating that the leakage rates are more consistent across the different PRMs.

Example 5. Comparison of Leakage of Different Types of Capsules in HDL Formulations A base heavy-duty liquid ("HDL") detergent composition having the formulation provided in Table 5A is prepared.

TABLE 5A

HDL formulation

| Component | Level [% active] |
|---|---|
| Water | Balance |
| Alkyl Ether Sulfate | 3.93 |
| Dodecyl Benzene Sulphonic Acid | 14.84 |
| Ethoxylated Alcohol | 3.83 |
| Amine oxide | 0.51 |
| Fatty Acid | 1.73 |
| Citric Acid | 0.54 |
| Sodium Diethylene triamine penta methylene phosphonic acid | 0.512 |
| Calcium chloride | 0.37 |
| Ethanol | 0.42 |
| Ethoxysulfated hexamethylene diamine quaternized | 0.66 |
| Co-polymer of Polyethylene glycol and vinyl acetate | 1.27 |
| 1,2-benzisothiazolin-3-one and 2-methyl-4-isothiazolin-3-one | 0.05 |
| Ethanol | 0.42 |
| Sodium Cumene Sulphonate | 1.724 |
| NaOH | 1.65 |
| Hydrogenated Castor Oil structurant | 0.3 |
| Silicone emulsion | 0.135 |
| Dye | 0.0056 |
| Optical Brightener | 0.046 |
| Enzyme | 0.033 |
| Perfume capsules (as % of perfume oil present) | 0.25 |

Example 5-1

A population of perfume capsules is prepared encapsulating the mixture of perfume raw materials "Perfume 1" in accordance to Example 2, Sample A. The capsules of one population comprise a silica-based first shell component and a second shell component, according to the present disclosure.

Comparative Example 5-1

A population of perfume capsules comprising a polyacrylate shell, encapsulating the same mixture of perfume raw material ("Perfume 1"), according to encapsulates made according to the processes disclosed in US Publication No. 2011/0268802.

Comparative Example 5-2

Capsules according to those disclosed in EP2500087B1 are made. 144 gr of Perfume 1 was weighed in a vessel. In a separate vessel, 96 gr of a 1 w % CTAC solution was created by mixing 3.84 gr of a 25 w % CTAC solution and bringing the mass to 96 gr with DI water. The above fragrance was mixed with the above surfactant mixture with an IKA ultraturrax mixer (S25N mixing tool) at 8000 rpm for 5 minutes.

Next, 144 gr of water with a pH of 3.8 (trimmed with Concentrated HCl) was added to the above prepared emulsion system.

Next, 27 gr of a mixture containing 26.73 gr of TEOS and 0.27 gr of DimethylDiethoxysilane was added dropwise to the emulsion system under constant mixing. When all of the precursor was added, the mixture was heated to 50 C and stirred at 200 rpm with an overhead mixer in a jacketed reactor for 2 hours.

Comparative Example 5-3

Capsules made according to those disclosed in WO2010013250A2 are made. The oil phase was prepared by mixing 20 gr of TEOS, 78 gr of Isopropyl Myristate (IPM) and 52 gr of perfume 1. Next, the water phase was prepared by weighing 10 gr of a 25 w % CTAC (aq.) solution and bringing the weight to 150 gr with DI water to reach a CTAC concentration of 1.67 w %. The two phases were mixed together with a Ultraturrax mixer (S25N tool from IKA) at 6000 rpm for 1 minute. Next, 50 g of Ludox TM50 was added and the system was further mixed at 8000 rpm for another 1 minute. Next, the pH was adjusted to 5 with 1M HCl.

To the above mixture, 50 gr of 10 w % PVOH in water (selvol 540) and 5 gr of a 25 w % sodium silicate in water were added. The pH was then readjusted to 4, and the system stirred at Room temperature at 200 rpm with an overhead mixer for 20 hours.

The four types of capsules are provided, respectively, to samples of the heavy-duty liquid composition so as to provide equal amounts of perfume (0.25%). The resulting products are stored for one week at 35° C. At the end of the storage period, samples of each product composition are analyzed for perfume leakage out of the capsule using headspace analysis. The data is reported as a percentage, determined by comparing the amount of the individual perfume raw materials found in the headspace to the amount originally provided to the capsules. The results are provided in Table 5B.

TABLE 5B

| Perfume 1 | | | Leakage (as %) after 1 week at 35° C. (*) | | | |
|---|---|---|---|---|---|---|
| | | | Example 5-1 | Comparative Example 5-1 | | |
| Perfume Raw Material | CAS # | logP | (silica shell) | (polyacrylate shell) | Comparative example 5-2 | Comparative example 5-3 |
| Ethyl 2-methyl butyrate | 7452-79-1 | 2.16 | 38% | 75% | 103% | 99% |
| Eucalyptol | 470-82-6 | 2.74 | 28% | 1% | 104% | 101% |
| 2,4-dimethylcyclohex-3-ene-1-carbaldehyde | 68039-49-6 | 2.34 | 31% | 12% | 104% | 101% |
| Tetrahydro myrcenol | 18479-57-7 | 3.54 | 26% | 3% | 107% | 105% |
| Tetrahydro linalool | 78-69-3 | 3.48 | 27% | 2% | 105% | 102% |
| iso-Bornyl acetate | 125-12-2 | 3.60 | 31% | 1% | 105% | 102% |
| (2-tert-butylcyclohexyl) acetate | 88-41-5 | 4.23 | 33% | 1% | 105% | 101% |
| (4-tert-butylcyclohexyl) acetate | 32210-23-4 | 4.23 | 27% | 0% | 108% | 100% |
| Verdyl acetate | 5413-60-5 | 3.63 | 26% | 1% | 107% | 104% |
| beta-Naphthyl methyl ether | 93-04-9 | 3.47 | 35% | 50% | 115% | 116% |
| | | Average: | 30% | 14% | 106% | 103% |
| | | StdDev: | 4% | 25% | 3% | 5% |

(*) Leakage values for Comparative Examples 5-2 and 5-3 are sometimes higher than 100%.

This is due to the inherent error of the measurement, which in cases where the capsules leak fully or nearly fully can show leakage numbers above 100%. It has been found that the error of the method increases as the absolute leakage values themselves get higher. These are considered herein as having capsules that have nearly fully or fully leaked during the test conditions.

As shown above in Table 5B, capsules according to the present disclosure leak, on average, relatively more with regard to the PRMs tested, compared to capsules having polyacrylate walls (comparative example 5-1). However, the standard deviation of the leakage rates of the capsules according to the present disclosure is relatively less compared to that of the polyacrylate capsules, indicating that the leakage rates are more consistent across the different PRMs. Without wishing to be bound by theory, it is believed that consistent leakage rates across the different PRMs provide perfume character consistency with the core perfume oil upon perfume release. Thus, the tested silica-based capsules provide certain advantages in an HDL product compared to the tested polyacrylate capsules.

In addition, Comparative Examples 5-2 and 5-3, which are made according to previously published disclosures of silica capsules, show a high leakage of approximately 100%*, while example 5-1, which is representative of the capsules of the present disclosure, has a lower leakage, but also a consistent leakage for all the tested PRMs. This shows the importance of choosing the right first shell components in combination with the right second shell components, as disclosed in the present invention.

Example 6. Benefit of a Second Shell Component

This example investigates the benefits associated with the second shell component.

Example 6-1: The population of capsules comprising a silica-based first shell component and second shell component, according to the present disclosure are prepared (Example 2, Sample A), encapsulating "Perfume 1".

Comparative Example 6-1: Comparative capsules having the same silica-based first shell component as Example 6-1 but no second shell component shell are also prepared, encapsulating the same perfume mixture as Example 6-1 ("Perfume 1").

The two types of capsules are provided, respectively, to samples of a base liquid fabric enhancer ("LFE") according the formulation provided in Example 3, Table 3, Composition 1 at levels so as to provide equal amounts of perfume. The resulting products are stored for one week at 35° C. At the end of the storage period, samples of each product composition are analyzed for perfume leakage out of the capsule using headspace analysis. The data is reported as a percentage, determined by comparing the amount of the individual perfume raw materials found in the headspace to the amount originally provided to the capsules. The results are provided in Table 6.

TABLE 6

| Perfume 1 | | | Leakage (as %) after 1 week at 35° C. | |
|---|---|---|---|---|
| Perfume Raw Material | CAS # | logP | Example 6-1 (w/ second shell component) | Comparative Example 6-1 (no second shell component) |
| Ethyl 2-methyl butyrate | 7452-79-1 | 2.16 | 6% | 101% |
| Eucalyptol | 470-82-6 | 2.74 | 8% | 72% |
| 2,4-dimethylcyclohex-3-ene-1-carbaldehyde | 68039-49-6 | 2.34 | 8% | 94% |
| Tetrahydro myrcenol | 18479-57-7 | 3.54 | 7% | 86% |
| Tetrahydro linalool | 78-69-3 | 3.48 | 8% | 83% |
| iso-Bornyl acetate | 125-12-2 | 3.60 | 9% | 5% |
| (2-tert-butylcyclohexyl) acetate | 88-41-5 | 4.23 | 11% | 5% |
| (4-tert-butylcyclohexyl) acetate | 32210-23-4 | 4.23 | 7% | 4% |
| Verdyl acetate | 5413-60-5 | 3.63 | 7% | 20% |
| beta-Naphthyl methyl ether | 93-04-9 | 3.47 | 2% | 83% |
| | | Average: | 7% | 55% |
| | | StdDev: | 2% | 41% |

As shown in Table 6, the leakage in the capsules having the second shell component is relatively less, and relatively more consistent, compared to the capsules without a second shell component.

Example 7. Benefits in Combination with Different Alkyl Ester Quats

Capsules according to Example 2, Sample A, having a silica-based first shell component and a second shell component, according to the present disclosure, encapsulating Perfume 1 are prepared and provided in equal amounts to three different liquid base compositions, resulting in three products useful as liquid fabric care compositions (e.g., liquid fabric enhancers). Each of the compositions (Compositions 1, 2, and 3) included a different conditioning active, as provided in Example 3, Table 3.

The resulting products are stored for one week at 35° C. At the end of the storage period, samples of each product composition are analyzed for perfume leakage out of the capsule using headspace analysis. The data is reported as a percentage, determined by comparing the amount of the individual perfume raw materials found in the headspace to the amount originally provided to the capsules. The results are provided in Table 7.

TABLE 7

| Perfume 1 | | | Leakage (as %) after 1 week at 35° C. | | |
|---|---|---|---|---|---|
| Perfume Raw Material | CAS # | logP | Composition 1 (Ester Quat 1) | Composition 2 (Ester Quat 2) | Composition 3 (Ester Quat 3) |
| Ethyl 2-methyl butyrate | 7452-79-1 | 2.16 | 1.3% | 1.0% | 2.2% |
| Eucalyptol | 470-82-6 | 2.74 | 2.1% | 1.3% | 2.0% |
| 2,4-dimethylcyclohex-3-ene-1-carbaldehyde | 68039-49-6 | 2.34 | 2.1% | 1.1% | 1.6% |
| Tetrahydro myrcenol | 18479-57-7 | 3.54 | 2.4% | 1.2% | 1.2% |
| Tetrahydro linalool | 78-69-3 | 3.48 | 2.3% | 1.1% | 1.2% |

TABLE 7-continued

| Perfume 1 | | | Leakage (as %) after 1 week at 35° C. | | |
|---|---|---|---|---|---|
| Perfume Raw Material | CAS # | logP | Composition 1 (Ester Quat 1) | Composition 2 (Ester Quat 2) | Composition 3 (Ester Quat 3) |
| iso-Bornyl acetate | 125-12-2 | 3.60 | 1.6% | 0.8% | 1.0% |
| (2-tert-butylcyclohexyl) acetate | 88-41-5 | 4.23 | 2.2% | 1.1% | 1.3% |
| (4-tert-butylcyclohexyl) acetate | 32210-23-4 | 4.23 | 0.1% | 0.1% | 0.7% |
| Verdyl acetate | 5413-60-5 | 3.63 | 1.2% | 0.8% | 1.2% |
| beta-Naphthyl methyl ether | 93-04-9 | 3.47 | 5.5% | 2.5% | 5.0% |
| | | Average: | 2.1% | 1.1% | 1.7% |
| | | StdDev: | 1% | 1% | 1% |

As shown in Table 7, the leakage in the capsules having a silica-based first shell component and a second shell component is relatively similar and consistent across product formulations that include various quat types.

Example 8. Benefits with Different Perfume Mixtures

Two different perfumes are encapsulated, respectively, in capsules having a silica-based first shell component and second shell component, in accordance with the present disclosure (Samples C and D from Example 2, Table 2A).

The two types of capsules are provided, respectively, to samples of a liquid fabric enhancer ("LFE") according the formulation provided in Example 3, Table 3, Composition 1, at levels so as to provide equal amounts of perfume. The resulting products are stored for one week at 35° C. At the end of the storage period, samples of each product composition are analyzed for perfume leakage out of the capsule using headspace analysis. The data is reported as a percentage, determined by comparing the amount of the individual perfume raw materials found in the headspace to the amount originally provided to the capsules. The results are provided in Table 8.

TABLE 8

| Perfume Raw Material | Leakage (as %) after 1 week at 35° C. |
|---|---|
| Capsule Sample C-Perfume 2 | |
| Ethyl 2-methyl butyrate | 21% |
| 2,4-dimethylcyclohex-3-ene-1-carbaldehyde | 12% |
| Tetrahydro linalool | 9% |
| [(4Z)-1-cyclooct-4-enyl] methyl carbonate | 5% |
| 1-(2,6,6-trimethyl-1-cyclohex-3-enyl)but-2-en-1-one | 4% |
| Diphenyl oxide | 4% |
| Verdyl acetate | 6% |
| 1-(5,5-dimethyl-1-cyclohexenyl) pent-4-en-1-one | 2% |
| 3a,4,5,6,7,7a-hexahydro-1H-4,7-methanoinden-1-yl propanoate | 4% |
| diethyl 1,4-cyclohexane dicarboxylate | 3% |
| Average: | 7% |
| StdDev: | 6% |
| Capsule Sample D-Perfume 3 | |
| Ethyl 2-methyl butyrate | 14% |
| Allyl caproate | 9% |
| Ligustral-1 | 8% |
| Tetrahydro linalool | 9% |
| Rose Oxide | 8% |
| Methyl phenyl carbinyl acetate | 7% |
| alpha-Terpineol | 10% |
| Citronellol | 4% |
| Undecavertol | 11% |
| iso-Bornyl acetate | 8% |
| Methyl nonyl acetaldehyde | 4% |
| 1-(2,6,6-trimethyl-1-cyclohex-3-enyl)but-2-en-1-one | 5% |
| Verdyl acetate | 8% |
| Pinyl iso-butyrate alpha | 7% |
| 1-(5,5-dimethyl-1-cyclohexenyl)pent-4-en-1-one | 2% |
| 3-Methyl-4-(2,6,6-trimethyl-2cyclohexen-1-yl)-3-buten-2-one | 6% |
| beta ionone | 5% |
| Average: | 7% |
| StdDev: | 3% |

As shown in Table 8, capsules according to the present disclosure show relatively low and consistent leakage across different perfume formulations when stored in a liquid fabric enhancer product. See also, for example, Example 7 above, which shows low leakage profiles for capsules comprising Perfume 1, as demonstrated in several composition matrices.

Example 9. Comparison to Known Capsules (1)

In this example, silica-based capsules according to the present disclosure are compared to silica-based capsules as disclosed by EP3078415A (see Comparative Example 9-1 and Comparative Example 9-2 below), using Perfume 4. Each is submitted to a leakage test.

Example 9-1

A population of perfume capsules comprising a silica-based first shell component and a second shell component is prepared encapsulating the mixture of perfume raw materials ("Perfume 4") in accordance to Example 2, Table 2A, Sample E.

Comparative Example 9-1

The water phase was prepared by diluting a 25 w % CTAC (aq.) solution (supplied by Sigma Aldrich) into DI water, to reach a concentration of 0.52 w % of CTAC. The oil phase was made by mixing 40 gr of "Perfume 4" and 10 gr of TEOS. The above oil phase was mixed with 100 gr of the above water phase using an ultraturrax mixer (S25N mixing tool from IKA), at 8500 rpm for 1 minute. The resulting emulsions pH was trimmed to 3.9 with the use of 1M NaOH (supplied by sigma Aldrich). Then, the emulsion was continuously stirred at 160 rpm with an overhead mixer and heated at 30 C for 17 hours in a jacketed reactor that was covered to avoid evaporation of water or any other components. After the 17-hour reaction time, capsules had formed. The capsules were collapsing when air dried.

Comparative Example 9-2

Capsules are made by the same process as Comparative Example 9-1, except that after the capsule slurry was formed, the pH was trimmed to 3.2 and 5.7 g of TEOS was added dropwise over 320 minutes while the temperature was maintained at 30 C and mixing speed at 160 rpm with an overhead mixer. After all the TEOS was added, the slurry was mixed for an additional 18 hours at 30 C and 160 rpm with an overhead mixer, to obtain capsules. The capsules were not collapsing when air dried.

The capsule slurries obtained from Example 9-1 and Comparative Examples 9-1 and 9-2 are provided, respectively, to samples of a liquid fabric enhancer ("LFE") according the formulation provided in Example 3, Table 3, Composition 1, at levels so as to provide equal amounts of perfume. The resulting products are stored for one week at 35° C. At the end of the storage period, samples of each product composition are analyzed for perfume leakage out of the capsule using headspace analysis. The data is reported as a percentage, determined by comparing the amount of the individual perfume raw materials found in the headspace to the amount originally provided to the capsules. The results are provided in Table 9.

TABLE 9

| Perfume 4 | | | Leakage (as %) after 1 week at 35° C. | | |
|---|---|---|---|---|---|
| Perfume Raw Material | CAS # | logP | Example 9-1 | Comparative Example 9-1 | Comparative Example 9-2 |
| Tetrahydro linalool | 78-69-3 | 3.48 | 17% | 70% | 76% |
| Alpha-ionone | 127-41-3 | 3.99 | 15% | 58% | 69% |
| Lilial | 80-54-6 | 4.36 | 30% | 46% | 61% |
| Hexylcinnamyl aldehyde | 101-86-0 | 4.86 | 7% | 22% | 36% |
| Hexyl Salicylate | 6259-76-3 | 5.07 | 3% | 34% | 28% |
| Verdyl acetate | 5413-60-5 | 3.63 | 13% | 67% | 72% |
| | | Average: | 14% | 52% | 55% |
| | | StdDev: | 9% | 16% | 24% |

As shown in Table 9, the test composition that includes the capsules of Example 9-1 is characterized by lower and more uniform leakage across PRMs compared to the comparative capsules.

Example 10. Comparison to Known Capsules (2)

In this example, silica-based capsules according to the present disclosure are compared to known capsules as disclosed by EP2500087B1 (see Comparative Example 10-1 below) and as disclosed by WO2010013250A2 (see Comparative Example 10-2 below), using Perfume 1. Example 10-2 and Comparative Example 10-2 each further include a core modifier, specifically isopropyl myristate, or "IPM." Each is submitted to a leakage test.

Example 10-1

Capsules of this example were made according to the protocol of Example 2, Sample F. The oil phase was composed of one part of precursor, and four parts of a mixture of benefit agent and core modifier (Perfume 1 and isopropyl myristate (IPM) at a 40/60 w/w ratio, respectively).

Example 10-2

Capsules of this example were made according to the protocol of Example 2, Sample A. The oil phase was composed of 1 part of precursor, and 4 parts of Perfume 1.

Comparative Example 10-1

Capsules according to those disclosed in EP2500087B1 are made. 144 gr of Perfume 1 was weighed in a vessel. In a separate vessel, 96 gr of a 1 w % CTAC solution was created by mixing 3.84 gr of a 25 w % CTAC solution and bringing the mass to 96 gr with DI water. The above fragrance was mixed with the above surfactant mixture with an IKA ultraturrax mixer (S25N mixing tool) at 8000 rpm for 5 minutes.

Next, 144 gr of water with a pH of 3.8 (trimmed with Concentrated HCl) was added to the above prepared emulsion system.

Next, 27 gr of a mixture containing 26.73 gr of TEOS and 0.27 gr of DimethylDiethoxysilane was added dropwise to the emulsion system under constant mixing. When all of the precursor was added, the mixture was heated to 50 C and stirred at 200 rpm with an overhead mixer in a jacketed reactor for 2 hours.

Comparative Example 10-2

Capsules made according to those disclosed in WO2010013250A2 are made. The oil phase was prepared by mixing 20 gr of TEOS, 78 gr of Isopropyl Myristate (IPM) and 52 gr of perfume 1. Next, the water phase was prepared by weighing 10 gr of a 25 w % CTAC (aq.) solution and bringing the weight to 150 gr with DI water to reach a CTAC concentration of 1.67 w %. The two phases were mixed together with a Ultraturrax mixer (S25N tool from IKA) at 6000 rpm for 1 minute. Next, 50 g of Ludox TM50 was added and the system was further mixed at 8000 rpm for another 1 minute. Next, the pH was adjusted to 5 with 1M HCl.

To the above mixture, 50 gr of 10 w % PVOH in water (selvol 540) and 5 gr of a 25 w % sodium silicate in water were added. The pH was then readjusted to 4, and the system stirred at Room temperature at 200 rpm with an overhead mixer for 20 hours.

Figure 5:
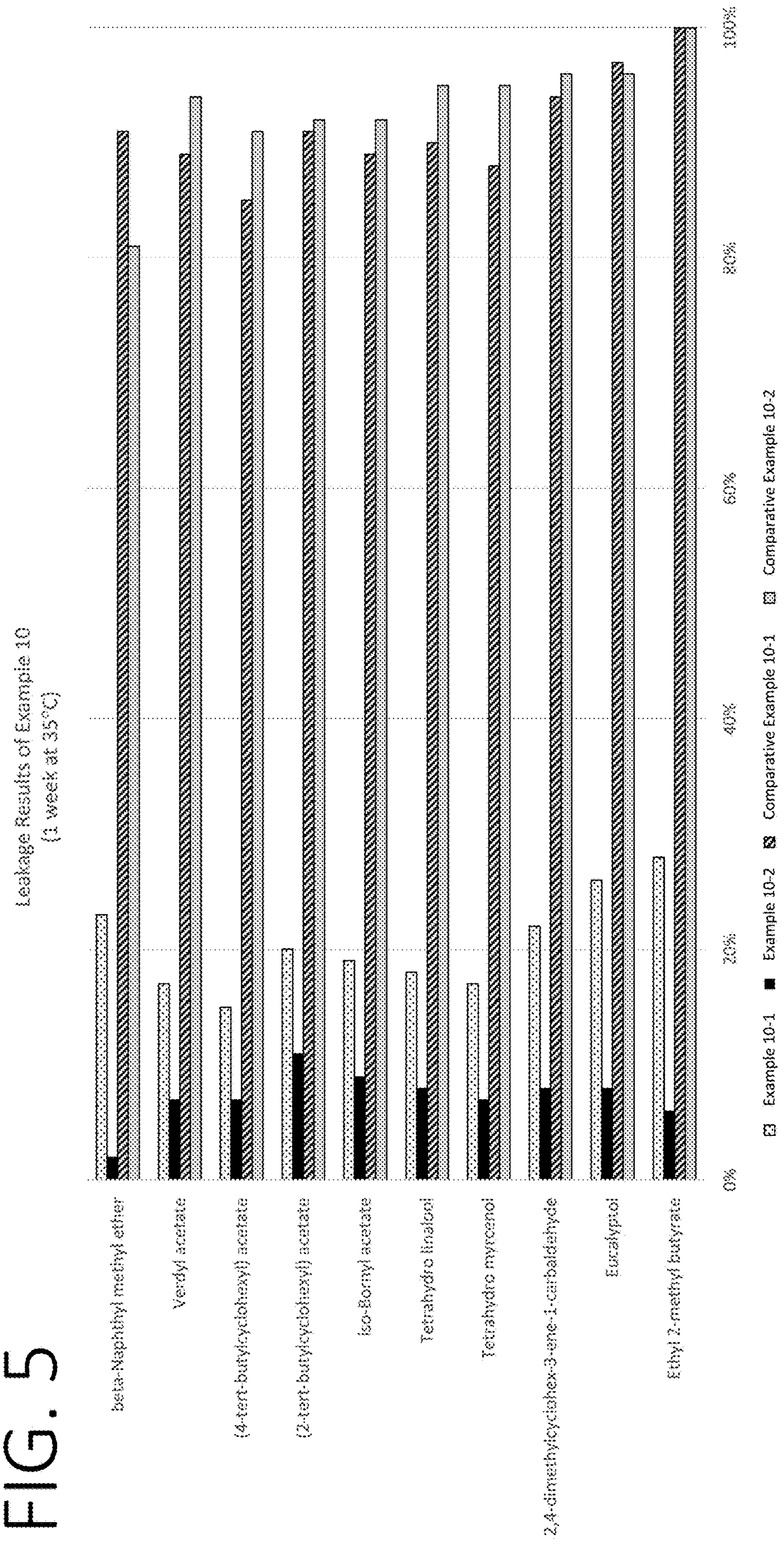
FIG. 5 is a graph of the leakage results of Example 10.

The capsule slurries obtained from Examples 10-1 and 10-2, and Comparative Examples 10-1 and 10-2 are provided, respectively, to samples of a liquid fabric enhancer ("LFE") according the formulation provided in Example 3, Table 3, Composition 1 above, at levels so as to provide equal amounts of perfume. The resulting products are stored for one week at 35° C. At the end of the storage period, samples of each product composition are analyzed for perfume leakage out of the capsule using headspace analysis. The data is reported as a percentage, determined by comparing the amount of the individual perfume raw materials found in the headspace to the amount originally provided to the capsules. The results are provided in Table 10. FIG. 5 shows a graph of the leakage results.

TABLE 10

| Perfume 1 | | | Leakage (as %) after 1 week at 35° C. | | | |
|---|---|---|---|---|---|---|
| Perfume Raw Material | CAS # | logP | Example 10-1 | Example 10-2 | Comparative Example 10-1 | Comparative Example 10-2 |
| Ethyl 2-methyl butyrate | 7452-79-1 | 2.16 | 28% | 6% | 100% | 100% |
| Eucalyptol | 470-82-6 | 2.74 | 26% | 8% | 97% | 96% |
| 2,4-dimethylcyclohex-3-ene-1-carbaldehyde | 68039-49-6 | 2.34 | 22% | 8% | 94% | 96% |
| Tetrahydro myrcenol | 18479-57-7 | 3.54 | 17% | 7% | 88% | 95% |
| Tetrahydro linalool | 78-69-3 | 3.48 | 18% | 8% | 90% | 95% |
| iso-Bornyl acetate | 125-12-2 | 3.60 | 19% | 9% | 89% | 92% |
| (2-tert-butylcyclohexyl) acetate | 88-41-5 | 4.23 | 20% | 11% | 91% | 92% |
| (4-tert-butylcyclohexyl) acetate | 32210-23-4 | 4.23 | 15% | 7% | 85% | 91% |
| Verdyl acetate | 5413-60-5 | 3.63 | 17% | 7% | 89% | 94% |
| beta-Naphthyl methyl ether | 93-04-9 | 3.47 | 23% | 2% | 91% | 81% |
| | | Average: | 21% | 7.4% | 90.5% | 93% |
| | | StdDev: | 4% | 2% | 5.2% | 5% |

As indicated by the results shown in Table 10, it is important to use a first shell component (including the right precursors of formula (I)) in combination with a second shell component as described in the present disclosure, in order to obtain both a low leakage and a uniform leakage for the tested PRMs.

Example 11. Exemplary Fabric Refresher Spray Formulations

Exemplary formulations for fabric refresher spray compositions are provided in Table 11. The liquid compositions provided in Table 11 may be packaged in any of the sprayers disclosed herein. The compositions may be sprayed upon a target fabric.

TABLE 11

| | Example | | |
|---|---|---|---|
| Ingredient | 11-1 | 11-2 | 11-3 |
| DI Water | Bal. | Bal. | Bal. |
| 1% K-gum solution [1] | 3.00 | 6.00 | 1.00 |
| 1% Xanthan solution [2] | 2.00 | 4.00 | 9.00 |
| Silica-based Capsules [3] (% is perfume oil present) | 0.23 | 2.31 | 0.23 |
| Polyacrylic Acid Solution [4] | 0.19 | 0.19 | 0.19 |
| Diethylene Glycol [5] | 0.25 | 0.25 | 0.25 |
| Silwet L-7600 [6] | 0.10 | 0.10 | 0.10 |
| Hydroxypropyl Beta CD [7] | 1.58 | 1.58 | 1.58 |
| Ethanol [8] | 3.18 | 3.18 | 3.18 |
| Benzisothiazolinone [9] | 0.08 | 0.08 | 0.08 |
| Target pH | 6-7 | 6-7 | 6-7 |

[1] Aqueous solution of konjac gum (Nutricol ® XP 3464, FMC Corporation, Philadelphia, PA); 1% active
[2] Aqueous solution of xanthan gum; 1% active
[3] Silica-based perfume capsules having a first and second shell component as disclosed in the present disclosure; see, e.g., capsules of Example 2
[4] KemEcal 142 PG, 100%, Kemira Chemicals, Inc., Atlanta, BA
[5] Diethylene glycol, 99.6% (100%), Indorama Ventures LLC, Pasadena, TX
[6] Polyalkyleneoxidemethylsiloxane Copolymer, 60-100% (100%), Momentive ™,
[7] Hydroxypropyl Beta Cyclodextrin (CD) Slurry-Cavasol W7 HP TL, 40%, Wacker Biosolutions, Munchen, Germany
[8] Ethanol-SDA40B/190PF/DNB TBA/137600, 94.3%, Equistar Chemicals, LP, Houston, TX
[9] Koralone ™ B-119 Preservative, 1,2-Benzisothiazolin-3-one, 19%,The Dow Chemical Company, Philadelphia, PA The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid fabric care composition comprising:

a fabric treatment adjunct, wherein the fabric treatment adjunct is selected from the group consisting of a conditioning active, a surfactant, or a mixture thereof, wherein, if present, the conditioning active is selected from the group consisting of an alkyl quaternary ammonium compound ("alkyl quat"), an alkyl ester quaternary ammonium compound ("alkyl ester quat"), and mixtures thereof, and wherein, if present, the surfactant is selected from the group consisting of anionic surfactant, nonionic surfactant, cationic surfactant, zwitterionic surfactant, amphoteric surfactant, ampholytic surfactant, and mixtures thereof;

a population of capsules, the capsules comprising a core and a shell surrounding the core, wherein the core comprises perfume raw materials, wherein the core is liquid;

wherein the shell is substantially inorganic and comprises silica and no more than 10% organic content;

wherein the shell comprises a mean shell thickness of 5 nm to 500 nm;

wherein the capsules comprise a mean volume weighted capsule diameter between 1 μm and 100 μm;

wherein the population of capsules has a permeability between 0.01% and 40%; and wherein the population of capsules has a fracture strength between 0.5M Pa and 10 MPa; and a free perfume, wherein the free perfume is present at a level of from 0.1% to 10%, by weight of the liquid fabric care composition.

2. The liquid fabric care composition from claim 1, further comprising free fatty acids.

3. The liquid fabric care composition from claim 1, wherein the outer layer of the shell comprises nanoparticles.

4. The liquid fabric care composition from claim 1, further comprising silica.

* * * * *